United States Patent
Tsutsumi

(10) Patent No.: US 9,025,038 B2
(45) Date of Patent: May 5, 2015

(54) IMAGE CAPTURING APPARATUS, IMAGE PROCESSING METHOD AND PROGRAM

(75) Inventor: Shohei Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/603,970

(22) Filed: Sep. 5, 2012

(65) Prior Publication Data

US 2013/0063614 A1 Mar. 14, 2013

(30) Foreign Application Priority Data

Sep. 12, 2011 (JP) ................... 2011-198879

(51) Int. Cl.
| | |
|---|---|
| H04N 5/228 | (2006.01) |
| H04N 5/232 | (2006.01) |
| G06K 9/40 | (2006.01) |
| H04N 5/225 | (2006.01) |
| H04N 5/247 | (2006.01) |

(52) U.S. Cl.
CPC ......... *H04N 5/2258* (2013.01); *H04N 5/23248* (2013.01); *H04N 5/247* (2013.01)

(58) Field of Classification Search
CPC ....... H04N 5/228; H04N 5/225; H04N 5/235; H04N 5/232; H04N 5/238; G06K 9/40; G06K 9/32
USPC ................. 348/208.1, 208.2, 208.4, 208.99, 348/208.13, 208.14, 208.16, 362, 364, 252; 348/248, 241, 243, 154, 155, 221.1, 208.11, 348/345, 218.1, 211.11, 159; 382/254, 255, 382/263, 284, 266, 294, 151, 264
See application file for complete search history.

(56) References Cited

U.S. PATENT DOCUMENTS

| | | | | |
|---|---|---|---|---|
| 7,986,343 | B2 * | 7/2011 | Kumagai et al. | 348/208.13 |
| 8,542,288 | B2 * | 9/2013 | Waqas et al. | 348/218.1 |
| 2004/0240052 | A1 * | 12/2004 | Minefuji et al. | 359/435 |
| 2005/0280702 | A1 * | 12/2005 | Nakano et al. | 348/42 |
| 2007/0258706 | A1 | 11/2007 | Raskar et al. | |
| 2008/0239135 | A1 * | 10/2008 | Tamura | 348/335 |
| 2011/0273572 | A1 * | 11/2011 | Tsuchida | 348/208.4 |
| 2012/0236168 | A1 * | 9/2012 | Tsutsumi | 348/208.4 |
| 2013/0038723 | A1 | 2/2013 | Tsutsumi | |

FOREIGN PATENT DOCUMENTS

| | | |
|---|---|---|
| JP | 2005-109623 A | 4/2005 |
| JP | 2006-074693 A | 3/2006 |

* cited by examiner

*Primary Examiner* — Tuan Ho
*Assistant Examiner* — Marly Camargo
(74) *Attorney, Agent, or Firm* — Fitzpatrick, Cella, Harper & Scinto

(57) ABSTRACT

This invention provides an image free from camera shake by using a plurality of images captured by a camera array image capturing apparatus. A determination unit determines whether to execute a camera shake correction processing. A memory unit temporarily stores only a group of images determined by a determination unit to be camera shake corrected. A camera shake correcting unit synthesizes images to correct blurs in the images. A matching point searching unit determines matching pixels by checking pixel value similarity between images. A moving amount calculating unit, based on the result acquired by the matching point searching unit, calculates a moving amount of each pixel between images. A position correcting unit, based on the moving amount of each pixel calculated by the moving amount calculating unit, corrects the positions of the images. An image synthesizing unit synthesizes a group of images that are position-corrected by the position correcting unit.

20 Claims, 33 Drawing Sheets

| IMAGE CAPTURING UNIT | FOCAL DISTANCE | SHUTTER SPEED | NO. OF CAPTURED IMAGES | CAMERA SHAKE CORRECTION |
|---|---|---|---|---|
| 101 | 25mm | 20ms | 1 | — |
| 102 | 50mm | 20ms | 1 | — |
| 103 | 100mm | 6ms | 3 | EXECUTE |
| 104 | 150mm | 6ms | 3 | EXECUTE |

FIG.9

| IMAGE CAPTURING UNIT | FOCAL DISTANCE | SHUTTER SPEED | NO. OF CAPTURED IMAGES | CAMERA SHAKE CORRECTION |
|---|---|---|---|---|
| 101 | 25mm | 20ms | 1 | — |
| 102 | 50mm | 20ms | 1 | — |
| 103 | 100mm | 6ms | 3 | EXECUTE |
| 104 | 150mm | 3.5ms | 3 | EXECUTE |

FIG.11

| IMAGE CAPTURING UNIT | FOCAL DISTANCE | SHUTTER SPEED | NO. OF CAPTURED IMAGES | CAMERA SHAKE CORRECTION |
|---|---|---|---|---|
| 101 | 25mm | 20ms | 1 | — |
| 102 | 50mm | 20ms | 1 | — |
| 103 | 100mm | 6ms | 3 | EXECUTE |
| 104 | 150mm | 3.5ms | 5 | EXECUTE |

FIG.19

| IMAGE CAPTURING UNIT | FOCAL DISTANCE | UNIT NO. | CAMERA SHAKE CORRECTION |
|---|---|---|---|
| A(2301~2304) | 25mm | | — |
| B(2305~2308) | 50mm | | — |
| C(2309~2312) | 100mm | 2309 | — |
| | | 2310 | EXECUTE |
| | | 2311 | EXECUTE |
| | | 2312 | — |
| D(2313~2316) | 150mm | 2313 | — |
| | | 2314 | EXECUTE |
| | | 2315 | EXECUTE |
| | | 2316 | — |

FIG.31

| IMAGE CAPTURING UNIT | FOCAL DISTANCE | UNIT NO. | CAMERA SHAKE CORRECTION |
|---|---|---|---|
| A(2301~2304) | 25mm | 2301 | — |
| B(2305~2308) | 50mm | 2305 | — |
| | | 2306 | EXECUTE |
| | | 2307 | EXECUTE |
| | | 2308 | — |
| C(2309~2312) | 100mm | 2309 | — |
| | | 2310 | EXECUTE |
| | | 2311 | EXECUTE |
| | | 2312 | — |
| D(2313~2316) | 150mm | 2313 | — |
| | | 2314 | EXECUTE |
| | | 2315 | EXECUTE |
| | | 2316 | EXECUTE |

FIG.32

| IMAGE CAPTURING UNIT | FOCAL DISTANCE | UNIT NO. | CAMERA SHAKE CORRECTION |
|---|---|---|---|
| A(2301~2304) | 25mm | 2301 | — |
| B(2305~2308) | 50mm | 2305 | — |
| | | 2306 | EXECUTE |
| | | 2307 | — |
| | | 2308 | — |
| C(2309~2312) | 100mm | 2309 | — |
| | | 2310 | EXECUTE |
| | | 2311 | EXECUTE |
| | | 2312 | — |
| D(2313~2316) | 150mm | | EXECUTE |

FIG.33

IMAGE CAPTURING APPARATUS, IMAGE PROCESSING METHOD AND PROGRAM

BACKGROUND OF THE INVENTION

1. Field of the Invention

The present invention relates to an image capturing apparatus, an image processing method and program. More specifically the invention relates to an image capturing apparatus, an image processing method and program to provide from a group of images captured by a camera array, an image free from camera shake.

2. Description of the Related Art

As image capturing apparatuses have been decreasing in size and cost in recent years, camera arrays (as known as camera array system, multiple lens camera, and the like) are being proposed that can realize a zooming function by capturing images of a subject using a plurality of lenses with different focal distances without the use of an optical zoom (e.g., Japanese Patent Laid-Open No. 2005-109623). In a camera array image capturing apparatus proposed by Japanese Patent Laid-Open No. 2005-109623, an angle of view is made variable by selecting an image acquired by a lens with an optimal focal distance that matches a desired zoom ratio. This allows a single image capture apparatus to capture images in a wide range of view angle, without requiring a drive mechanism for zooming.

Recent years have seen a growing trend for a higher resolution and a higher zoom ratio of image capturing apparatuses, which has led to a problem of blurs in captured images caused by camera shake during an image capturing operation. Under these circumstances, cameras with a camera shake correcting function have come into wide use. Among such camera shake correcting methods there is an optical camera shake correction method that optically corrects camera shake by using a gyro sensor for detecting a camera shake angular velocity and a drive apparatus that controls a relative position between an image capturing lens and an image capturing element so as to cancel the camera shake. An electronic camera shake correcting method is also being proposed which generates an image with reduced camera shake by first capturing a plurality of images of a subject with a fast shutter speed and then electronically align and overlap the plurality of images in position (e.g., Japanese Patent Laid-Open No. 2006-074693). The electronic camera shake correcting method as proposed by Japanese Patent Laid-Open No. 2006-074693 does not require the gyro sensor and therefore can reduce the size of a camera.

Further, a technique called a Coded Exposure is also being proposed which performs a deconvolution calculation using shutter open/close information to correct camera shake or the shake of a subject itself (e.g., U.S. Patent Publication No. 2007/0258706). More specifically, this method calculates a distribution of shakes that occur during a period of capturing images by using a gyro sensor or the like and, based on an exposure time and the shake distribution, estimates a point spread function (PSF), a blur function of a point image on an interested image. This method further calculates a frequency characteristic of PSF and filters the image through a filter with a reversed frequency characteristic, or Wiener filter, to achieve an appropriate camera shake correction.

With the method proposed by Japanese Patent Laid-Open No. 2005-109623, however, since it does not employ a mechanism to correct camera shake, when an image of a subject is captured with a lens with a long focal distance in particular, blurs caused by camera shake become more likely to appear in the captured image. However, if an optical camera shake correction mechanism is mounted on each lens to avoid this problem, a lens unit will increase in size. In camera array image capturing with a plurality of lenses, this makes the overall size of the camera prohibitively large.

The method proposed by Japanese Patent Laid-Open No. 2006-074693 requires a plurality of images to be taken in, which means it is necessary to provide enough memory to accommodate the plurality of images for a position alignment operation. If, however, such an electronic camera shake correcting method is applied to all image capturing units of a camera array image capturing apparatus proposed by Japanese Patent Laid-Open No. 2005-109623, a large amount of memory is required, pushing up the manufacturing cost.

With the method proposed by U.S. Patent Publication No. 2007/0258706, the shutter needs to be operated randomly during exposure and at the same time an additional mechanism such as a gyro sensor to detect camera shake during an image capturing operation must be provided. If the shutter control during exposure is applied to all image capturing units of a camera array image capturing apparatus proposed by Japanese Patent Laid-Open No. 2005-109623, the mechanism for shutter control becomes complicated.

SUMMARY OF THE INVENTION

To solve the aforementioned problems, the present invention provides a camera array image capturing apparatus having a plurality of image capturing means that capture images of a subject from a plurality of different viewing positions; wherein the plurality of image capturing means each have an image capturing lens with a different focal distance and an image capturing element to acquire an image of the subject captured through the lens; wherein, of the plurality of image capturing means, one with a lens of a relatively long focal distance has a correction means to correct blurs of the subject image acquired.

This invention provides a camera array image capturing apparatus having a camera shake detecting unit that detects an amount of camera shake occurring during an image capturing operation and a plurality of image capturing means that captures images of a subject from a plurality of different viewing positions; wherein the plurality of image capturing means each have an image capturing lens with a different focal distance and an image capturing element to acquire an image of the subject captured through the lens; wherein, of the plurality of image capturing means, one with a lens of a relatively long focal distance has a correction means to correct blurs of the subject image acquired, based on the amount of camera shake detected by the camera shake detecting unit.

This invention provides a camera array image capturing apparatus having a camera shake detecting unit that detects an amount of camera shake occurring during an image capturing operation and a plurality of image capturing means that captures images of a subject from a plurality of different viewing positions; wherein the plurality of image capturing means each have an image capturing lens with a different focal distance and an image capturing element to acquire an image of the subject captured through the lens; wherein, of the plurality of image capturing means, one with a lens of a relatively long focal distance has a drive means that prevents blurs from appearing in the subject image acquired, by driving the image capturing means based on the amount of camera shake detected.

This invention provides a camera array image capturing apparatus having a plurality of image capturing means that capture images of an subject from a plurality of different viewing positions; wherein the plurality of image capturing means each have an image capturing lens with a different focal distance and an image capturing element to acquire an image of the subject captured through the lens; wherein, of the plurality of image capturing means, one with a lens of a relatively short focal distance does not perform a camera shake correction on the subject image acquired.

This invention provides an image processing method for a camera array image capturing apparatus, wherein the camera array image capturing apparatus has a plurality of image capturing means to capture images of a subject from a plurality of different viewing positions, the image capturing means each having an image capturing lens with a different focal distance and an image capturing element to acquire an image of the subject captured through the lens; the image processing method comprising the steps of: image capturing a plurality of images by the plurality of image capturing means; and correcting blurs of the acquired images of the subject captured by those of the plurality of image capturing means which have lenses with relatively long focal distances.

This invention provides an image processing method for a camera array image capturing apparatus, wherein the camera array image capturing apparatus has a plurality of image capturing means to capture images of an subject from a plurality of different viewing positions, the image capturing means each having an image capturing lens with a different focal distance and an image capturing element to acquire an image of the subject captured through the lens; the image processing method comprising the steps of: detecting an amount of camera shake occurring during an image capturing operation; capturing a plurality of images by the plurality of image capturing means; and correcting blurs of the subject image acquired, based on the amount of camera shake detected by the camera shake detecting step.

This invention provides an image processing apparatus comprising: an acquisition means to acquire a plurality of pieces of image data and an image capturing condition, both produced when images of a subject are captured from a plurality of different viewing positions by a plurality of image capturing means, each having an image capturing lens with a different focal distance and an image capturing element to acquire an image of the subject captured through the lens; and a camera shake correcting means to correct blurs of the image of the subject captured by those of the plurality of image capturing means which have lenses with relatively long focal distances.

This invention provides an image processing apparatus comprising: a first acquisition means to acquire an amount of blurs detected during an image capturing operation; a second acquisition means to acquire a plurality of pieces of image data and an image capturing condition, both produced when images of a subject are captured from a plurality of different viewing positions by a plurality of image capturing means, each having an image capturing lens with a different focal distance and an image capturing element to acquire an image of the subject captured through the lens; and a camera shake correcting means to correct, based on the amount of camera shake acquired by the first acquisition means, blurs of the image of the subject captured by those of the plurality of image capturing means which have lenses with relatively long focal distances.

This invention relates to a camera array image capturing apparatus, an image processing method and a program to produce an image free from camera shake by using a plurality of images captured by the camera array image capturing apparatus.

Further features of the present invention will become apparent from the following description of exemplary embodiments (with reference to the attached drawings).

BRIEF DESCRIPTION OF THE DRAWINGS

FIG. 9 shows setting of each image capturing unit in a camera shake correction processing according to embodiment 1;

FIG. 11 shows setting of each image capturing unit in a camera shake correction processing according to embodiment 1;

FIG. 19 shows setting of each image capturing unit in the second example of the exposure control of the image capturing units of embodiment 2;

FIG. 31 shows an example of image capturing units and focal distances in the camera array image capturing apparatus according to embodiment 5;

FIG. 32 shows an example of image capturing units and focal distances in the camera array image capturing apparatus according to embodiment 5; and FIG. 33 shows an example of image capturing units and focal distances in the camera array image capturing apparatus according to embodiment 5.

DESCRIPTION OF THE EMBODIMENTS

Embodiment 1

Figure 1:
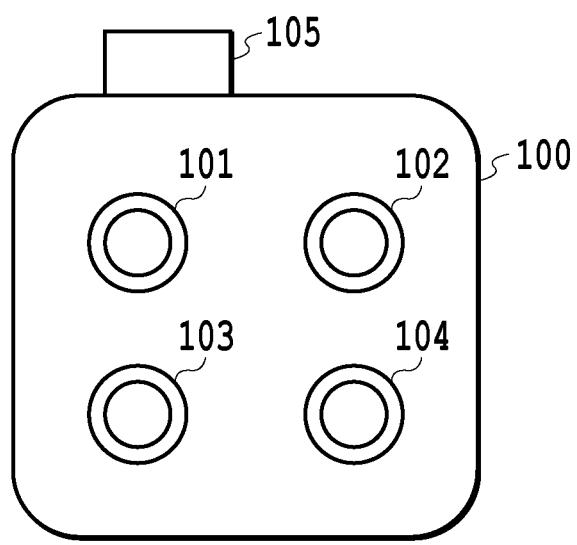
FIG. 1 shows an example embodiment of a camera array image capturing apparatus with a plurality of image capturing units.

FIG. 1 shows an example of a camera array image capturing apparatus with a plurality of image capturing units. In a case 100 of the image capturing apparatus there are provided four image capturing units 101-104 for capturing color images and a shutter-release button 105. The four image capturing units 101-104 are arranged evenly at square lattice points. When the user presses the shutter button 105, the image capturing units 101-104 receive optical information of a subject at their sensors (image capturing elements), with the received signals A/D-converted to produce a plurality of color images (digital data) at once. With such a camera array image capturing apparatus, a group of color images of one and the same subject can be obtained which are captured from multiple viewing positions.

While this embodiment takes up an example case of four image capturing units, this invention can be applied to image capturing apparatuses with any other number of multiple image capturing units. Further, although in this embodiment the four image capturing units have been described to be arranged uniformly at square lattice points, their arrangement is arbitrary. They may be arranged in line or randomly arranged.

Figure 2:
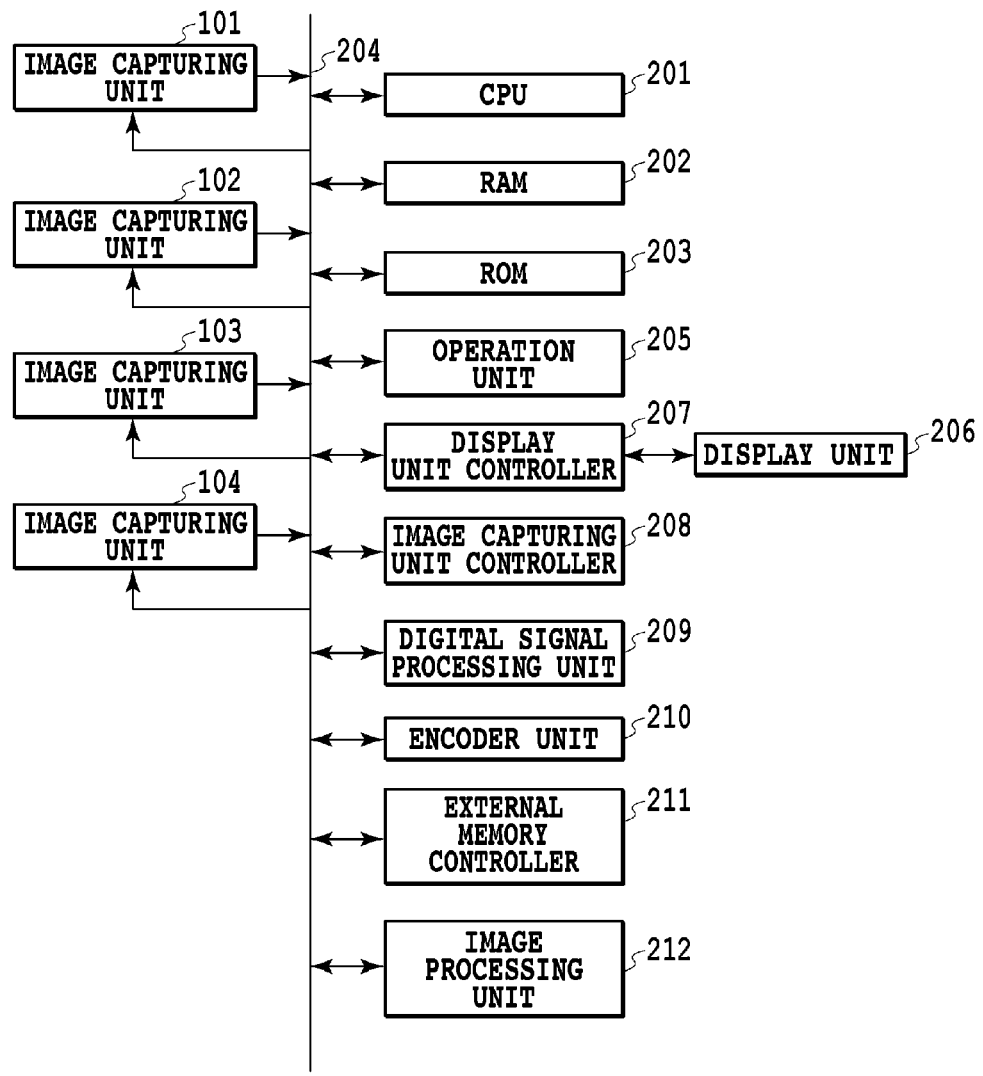
FIG. 2 is a block diagram showing an internal configuration of a camera array image capturing apparatus according to embodiment 1.

FIG. 2 is a block diagram showing an internal configuration of the image capturing apparatus 100. A central processing unit (CPU) 201 of this embodiment performs a general control on a variety of components. RAM 202 functions as a main memory and a work area for the CPU 201. ROM 203 stores a control program to be executed by the CPU 201. A bus 204 provides paths through which to transfer a variety of data. For example, digital data picked up by the image capturing units 101-104 are sent via the bus 204 to their associated processing units. An operation unit 205 has, for example, buttons and a mode dial and receives instructions from the user.

A display unit 206 displays captured images and characters and may, for example, employ a liquid crystal display. The display unit 206 may have a touch screen function, in which case user instructions through the touch screen can be treated as inputs from the operation unit 205. A display unit controller 207 controls the captured images and characters to be displayed on the display unit 206. An image capturing unit controller 208 performs controls on an image capturing system according to instructions from the CPU 201, such as focusing, closing and opening of shutter and iris adjustment for the image capturing units 101-104. A digital signal processing unit 209 performs operations, such as white balance processing, gamma processing and noise reduction processing, on the digital data received via the bus 204.

An encoder unit 210 converts the digital data into a file format, such as JPEG and MPEG. An external memory controller 211 is an interface through which to connect to PC-incorporated media and others, such as hard disks, memory cards, CF cards, SD cards and USB memories.

An image processing unit 212 performs an image stabilization processing using a group of color images acquired by the image capturing units 101-104 or output from the digital signal processing unit 209. Details of the image processing unit 212 will be described later. Although the image capturing apparatus generally has other constitutional elements, their explanation will be omitted for the sake of simplicity of explanation. In this embodiment, all the image processing will be described to be executed in one image capturing apparatus, other arrangements may be made. For example, data captured by respective image capturing units of the image capturing apparatus may undergo predetermined processing before being transferred over networks or through removable media to other image processing apparatus where they are subjected further processing. In that case, image capturing conditions, settings of the image capturing units and other required information may be handed over from the appropriate image capturing apparatus to the image processing apparatus.

Figure 3:
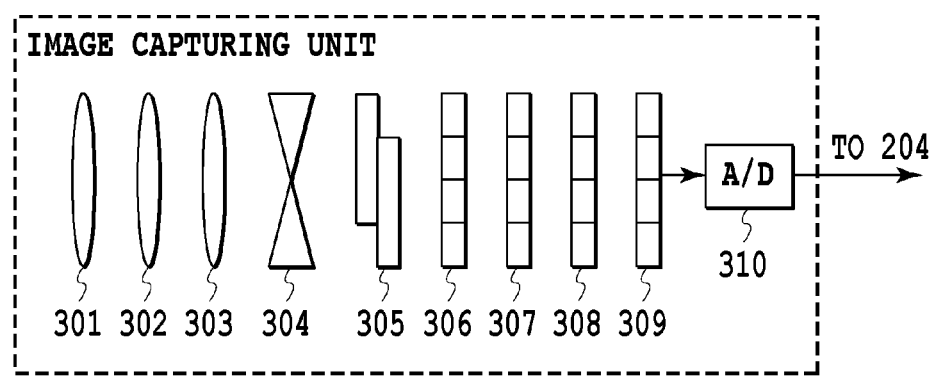
FIG. 3 shows an internal configuration of the image capturing unit according to embodiment 1.
Figure 4:
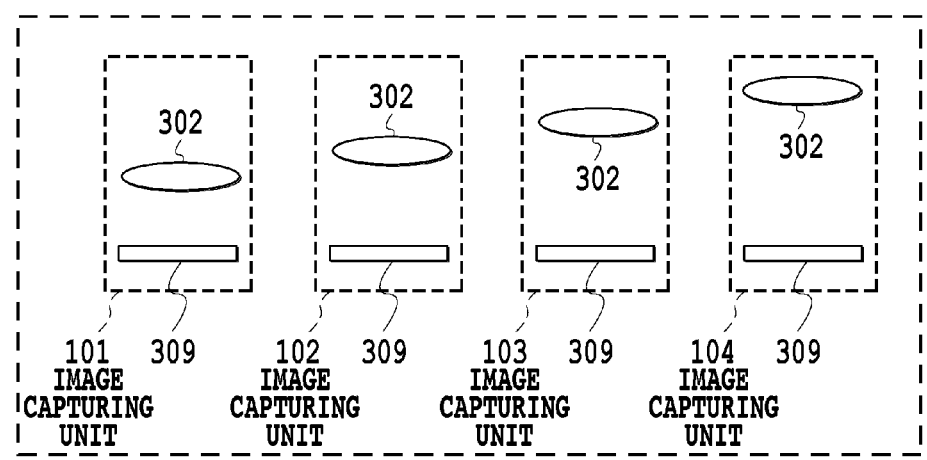
FIG. 4 shows an internal configuration of the image capturing units with different focal distances according to embodiment 1.

FIG. 3 shows an internal configuration of the image capturing units 101-104. The image capturing units have image capturing lenses 301-302, an iris 304, a shutter 305, an optical low-pass filter 306, an iR cut filter 307, a color filter 308, a sensor 309 and an A/D converter 310. The image capturing lenses 301 and 302 represent a zoom lens and a focus lens, respectively. As shown in FIG. 4, the image capturing units 101-104 have their zoom lenses located at different positions so that they have different focal distances. Here, the distance between the sensor 309 and the lens 302 is shown to represent the focal distance for intuitive understanding. The sensor 309 is an image capturing element such as CMOS and CCD. When the sensor 309 detects light from the subject, the amount of light detected is converted into a digital value by the A/D converter 310, which then outputs digital data onto the bus 204.

<Configuration of Image Capturing Units>

FIG. 4 shows an example of positions at which the zoom lenses 302 are disposed in the image capturing units 101-104. Referring to FIG. 4, the zoom lens 302 in the image capturing unit 101 is located closer to the sensor 309 than in other units. It is intuitively understood from this figure that the lens in the image capturing unit 101 has a shorter focal distance and that the image capturing unit 101 provides a wider angle of view. The zoom lens in the image capturing unit 104, on the other hand, is located remote from the sensor. That is, it has a longer focal length, providing a narrower angle of view. In this embodiment, the focal distance is set at 25 mm, 50 mm, 100 mm and 150 mm for the image capturing units 101, 102, 103 and 104, respectively. With the image capturing apparatus made up of a plurality of image capturing units having different focal distances, as shown in FIG. 4, it is possible to take a plurality of images of the same subject in compositions with a range of view angle, from a wide to a narrow angle, in one image capturing operation.

Although descriptions have been made of the image capturing units incorporating an adjustable zoom lens by referring to FIG. 4, the image capturing units may use a fixed zoom lens. The only requirement is that the image capturing apparatus needs to be a camera array image capturing apparatus that can capture images at two or more different focal distances. Further, while in this embodiment the sensors 309 used in this image capturing apparatus all have the same number of pixels and the same size, they may have different numbers of pixels and different sizes among different image capturing units. It is also noted that while this embodiment uses four image capturing units with different focal distances, this invention is also applicable to any image capturing apparatus incorporating any other number of image capturing units with different focal distances. Furthermore, although in an image capturing apparatus explained in this embodiment all the image capturing units have different focal distances, the image capturing apparatus may have a plurality of image capturing units with the same focal distance.

Figure 5:
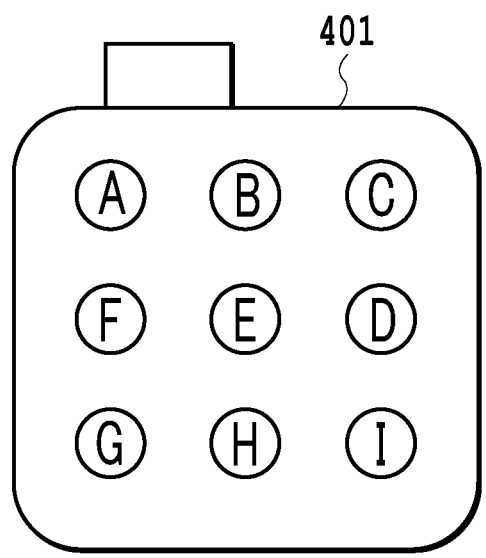
FIG. 5 shows another example of camera array image capturing apparatus applicable to this invention.
Figure 6:
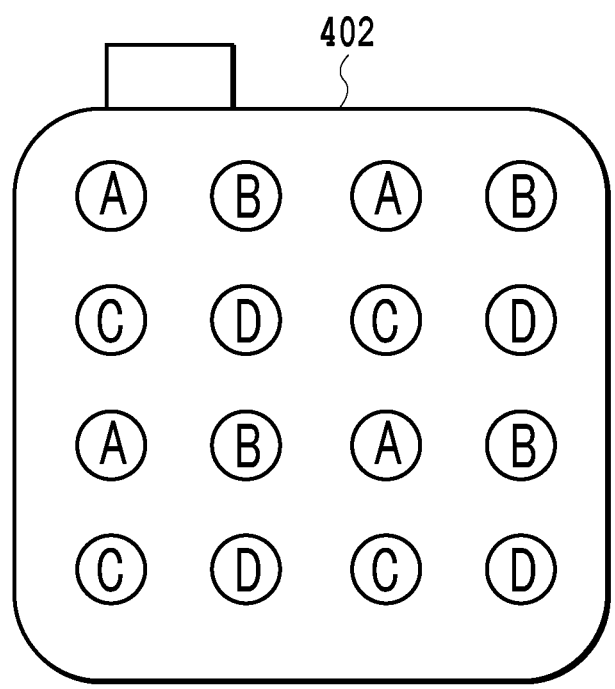
FIG. 6 shows another example of camera array image capturing apparatus applicable to this invention.
Figure 7:
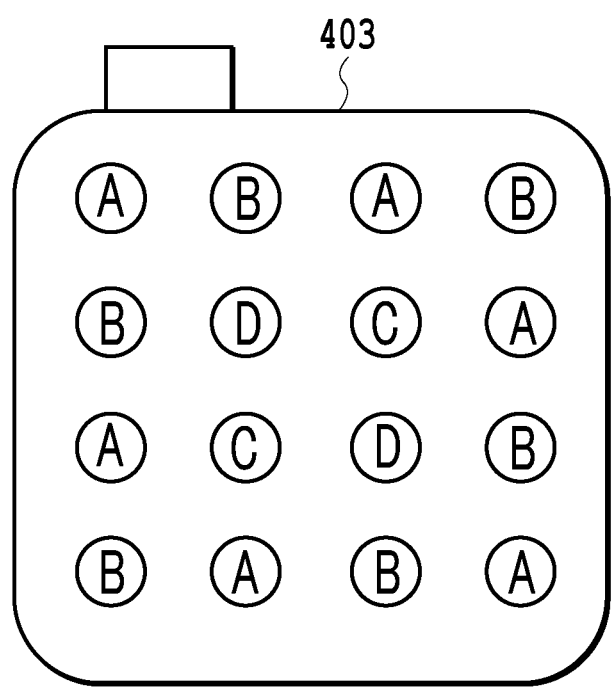
FIG. 7 shows another example of camera array image capturing apparatus applicable to this invention.

FIG. 5 shows another example of a camera array image capturing apparatus applicable to this invention. Alphabets in the figure represent focal distances of the image capturing units, and the image capturing units with the same alphabet have the same focal distance. FIG. 5 represents an example of a camera array image capturing apparatus with nine different focal distances. FIG. 6 and FIG. 7 show examples of image capturing apparatus with four different focal distances. In the image capturing apparatus of FIG. 6, for each of the four different focal distances there are provided four image capturing units. The image capturing apparatus shown in FIG. 7 is provided with six image capturing units for each of the focal distances A and B and two image capturing units for each of the focal distances C and D.

<Camera Shake Correction Processing>

Figure 8:
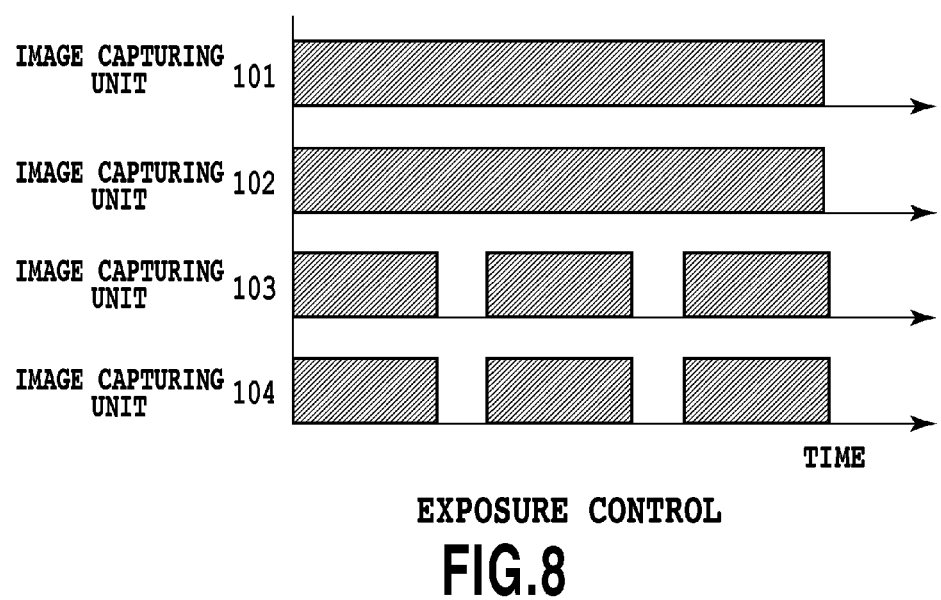
FIG. 8 shows an example of an exposure control of the image capturing units according to embodiment 1.

FIG. 8 shows an exposure control on the image capturing units 101-104. The image capturing units 101 and 102 have relatively short focal distances (wide angles of view) and therefore are not likely to produce blurred images even when a subject moves fast or when the image capturing apparatus with which to capture images of the subject is being shaken. The image capturing units 103 and 104, on the other hand, have relatively longer focal distances (narrower view angles) and thus can easily produce camera shake when the image capturing apparatus is subject to the similar level of camera shake. In this embodiment, only the image capturing units 103 and 104 with relatively long focal distances are provided with an electronic camera shake correction mechanism as proposed by Japanese patent literature 2. That is, only the image capturing units 103 and 104 have their exposure time split into a plurality of shorter exposure times in a time-division exposure method to capture a plurality of images. In this time-division exposure, the shutter speed is so set that no camera shake will appear in image capturing. Then these multiple images captured at higher speeds are synthesized in order to correct camera shake. For the image capturing units 101 and 102 with relatively shorter focal distances, the camera shake correction is not performed in this embodiment.

FIG. 9 shows shutter speeds and the number of images captured by the image capturing units 101-104 during one image capturing operation. That is, the image capturing units 103 and 104 execute image capturing processing more than one time (three times for the case showed in FIG. 9), in one image capturing operation. The image capturing units 101 and 102 are set at a shutter speed of 20 ms and acquire a single image in one image capturing operation, as during a normal image capturing operation. The image capturing units 103 and 104, on the other hand, are set at a shutter speed of 5 ms and made to take three images in one image capturing operation. Then, a camera shake correction processing is performed on the image capturing units 103 and 104 using the three images taken. The camera shake correction processing is not limited to the image capturing units 103 and 104 but may also be done to the image capturing unit 102. Or, the camera shake correction processing may be performed only on the image capturing unit 104 with the longest focal distance.

Conversely, in addition to the image capturing units 101 and 102, the image capturing unit 103 may also be excluded from the camera shake correction processing. Alternatively, only the image capturing unit 101 with the shortest focal distance may be excluded from the camera shake correction processing. Further, the number of images captured for the camera shake correction processing is not limited to four. Any number of images, at least two or more, may be used for the camera shake correction processing.

Figure 10:
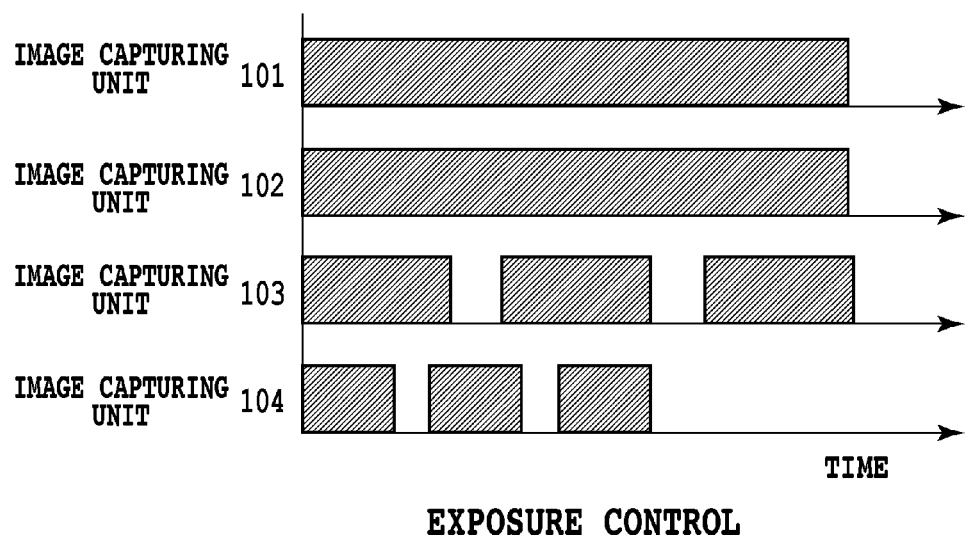
FIG. 10 shows an example of the exposure control of the image capturing units according to embodiment 1.

In the exposure control shown in FIG. 8, the image capturing units 103 and 104, for which the camera shake correction is performed, capture images of a subject at the same shutter speed. FIG. 10 and FIG. 11 show a relationship between the exposure control and the number of images captured when the shutter speeds of the image capturing units are determined based on the focal distances of the image capturing units. FIG. 10 shows an exposure control of the image capturing units 101-104. As in FIG. 8, the image capturing units 101 and 102 have relatively short focal distances (wide view angles), so that even when the subject moves fast and camera shake occurs, the captured images are not likely to be blurred. So, the camera shake correction processing is not performed.

In the case of the image capturing units 103 and 104 with relatively long focal distances (narrow view angles), the images of the subject easily blur even with the same level of camera shake. Further, with the image capturing unit 104, longer in focal distance than the image capturing unit 103, the images can all the more easily be blurred. With these taken into consideration, the image capturing unit 104 with a relatively long focal distance has the shutter speed during the time-division image capturing set at a higher speed (shorter exposure time). That is, the longer the focal distance, the greater the blurring effect will be. So, by increasing the shutter speed the captured image can be made less susceptible to the blurring effect.

FIG. 11 shows shutter speeds and the number of images captured in one image capturing operation by the image capturing units 101-104. The image capturing units 101 and 102 have their shutter speeds set at 20 ms and acquire one image respectively in one image capturing operation. The image capturing unit 103 with a focal distance of 100 mm is set at a shutter speed of 5 ms. Further the image capturing unit 104 with a longer focal length than the image capturing unit 103 has its shutter speed set at 3.5 ms. Making the settings as shown in FIG. 10 and FIG. 11, i.e., setting relatively high shutter speeds for the image capturing units with relatively long focal distances, for which the camera shake correction processing is to be performed, offers an advantage of being able to make it further less likely for the camera shake to occur in one captured image.

Figure 12:
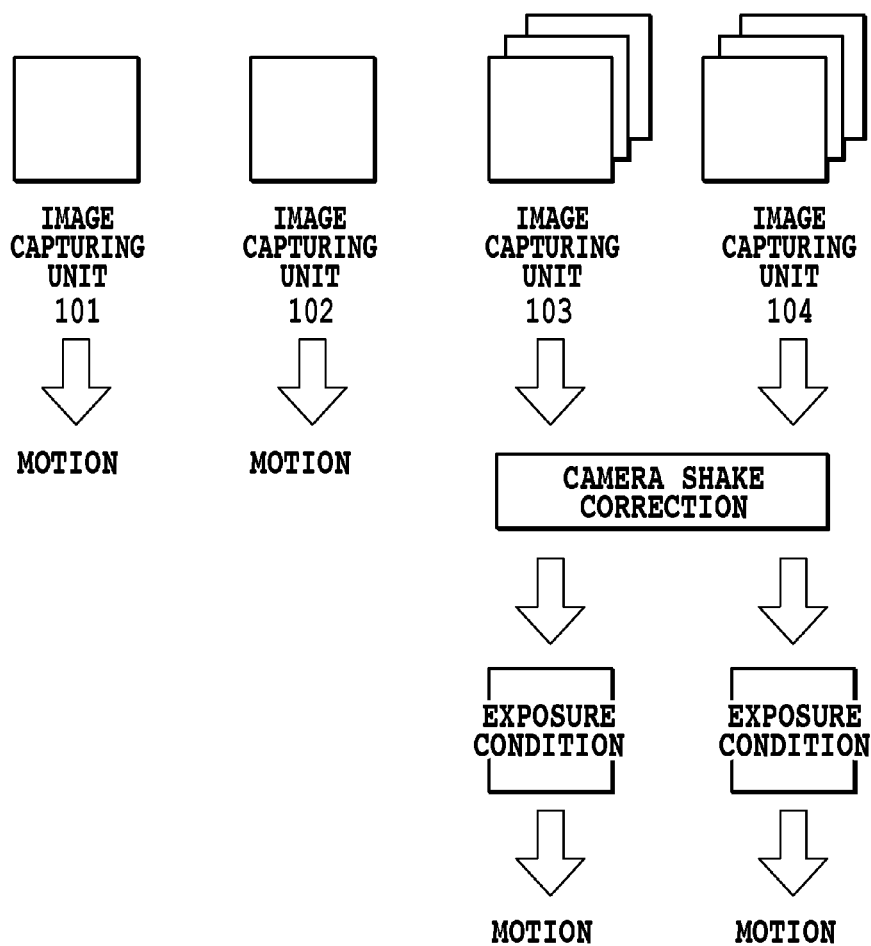
FIG. 12 shows the camera shake correction processing according to embodiment 1.

FIG. 12 shows a conceptual diagram of the camera shake correction processing. It is determined that image degradations caused by camera shake in the image capturing units 101 and 102 are negligible. So, no camera shake correction processing is performed and only the two images captured in one image capturing operation, one from each of the image capturing units 101, 102, are output. The image capturing units 103 and 104, on the other hand, have long focal distances and are determined to be susceptible to the camera shake. So, the time-division exposure is performed to acquire a plurality of images, on which the camera shake correction processing is executed. The corrected images are then output. Although detailed later, the camera shake correction processing of this embodiment involves electronically aligning the positions of the plurality of captured images and correcting blurs by using the overlapped images. To execute such a camera shake correction processing, however, requires a memory and a large volume of calculations for the position alignment processing. To cope with this problem, this embodiment omits the camera shake correction processing on the images captured by the image capturing units 101 and 102 with relatively short focal distances in order to reduce the amount of memory and the calculation load.

<Configuration of Image Processing Unit>

Figure 13:
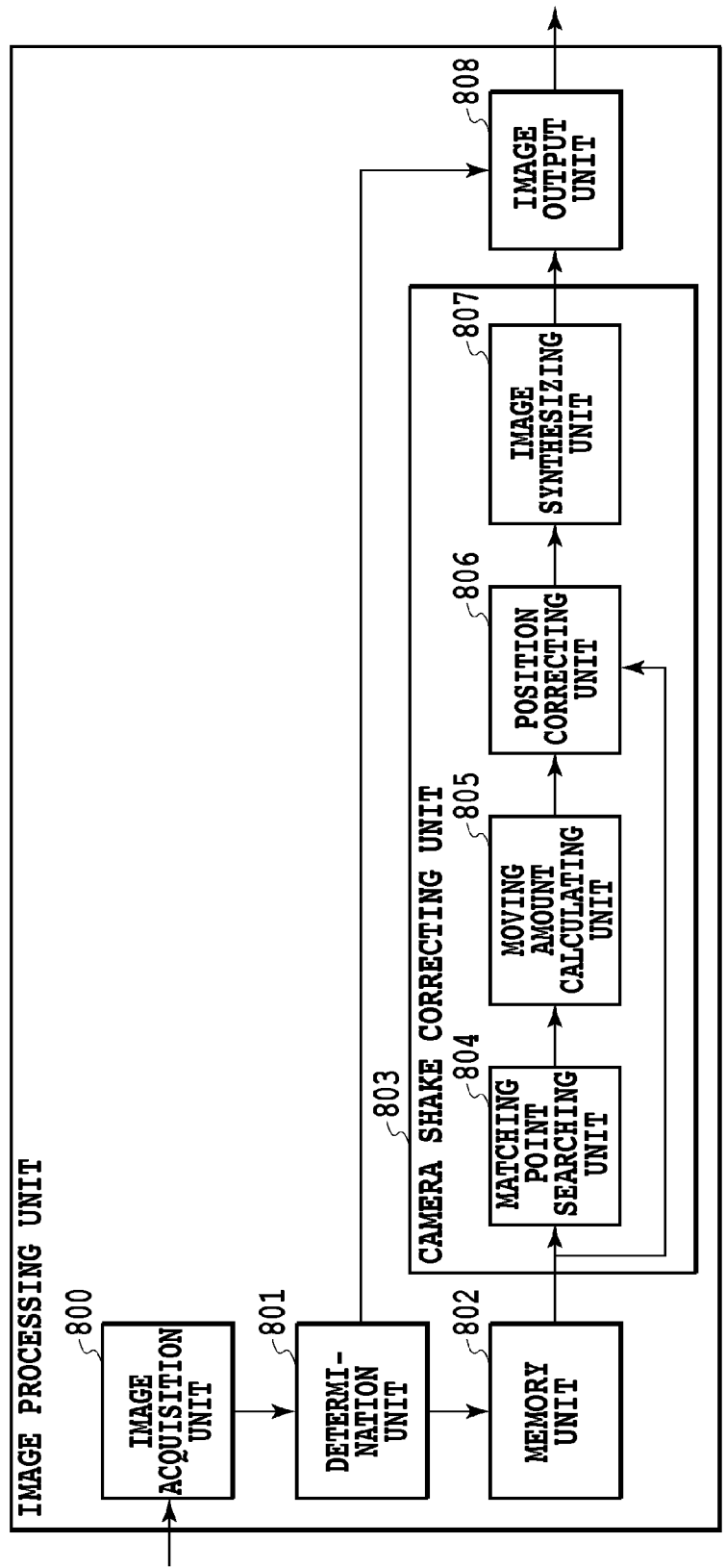
FIG. 13 shows an internal configuration of the image processing unit according to embodiment 1.

FIG. 13 is a block diagram showing an internal configuration of the image processing unit 212 of this embodiment. An image acquisition unit 800 acquires a group of images that are supplied from the image capturing units 101-104 via the bus 204. A determination unit 801 determines whether or not to execute the camera shake correction processing, as described later. A memory unit 802 temporarily stores a group of images which the determination unit 801 has determined will undergo the camera shake correction processing. A camera shake correcting unit 803 corrects image blurs by synthesizing a plurality of images. A matching point searching unit 804 determines matching pixels by checking pixel value similarity between images.

A moving amount calculating unit 805, based on the result of operation by the matching point searching unit 804, calculates a moving amount of each pixel between images. A position correcting unit 806, based on the moving amount of each pixel calculated by the moving amount calculating unit 805, corrects the positions of the images supplied from the memory unit 802. An image synthesizing unit 807 synthesizes a group of images that are position-corrected by the position correcting unit 806. Described above is the explanation of the individual units that together constitute the function of the camera shake correcting unit 803. Then, the blur-corrected images from the camera shake correcting unit 803 and the images that have been determined by the determination unit 801 not to undergo the camera shake processing are output from the image output unit 808.

Figure 14:
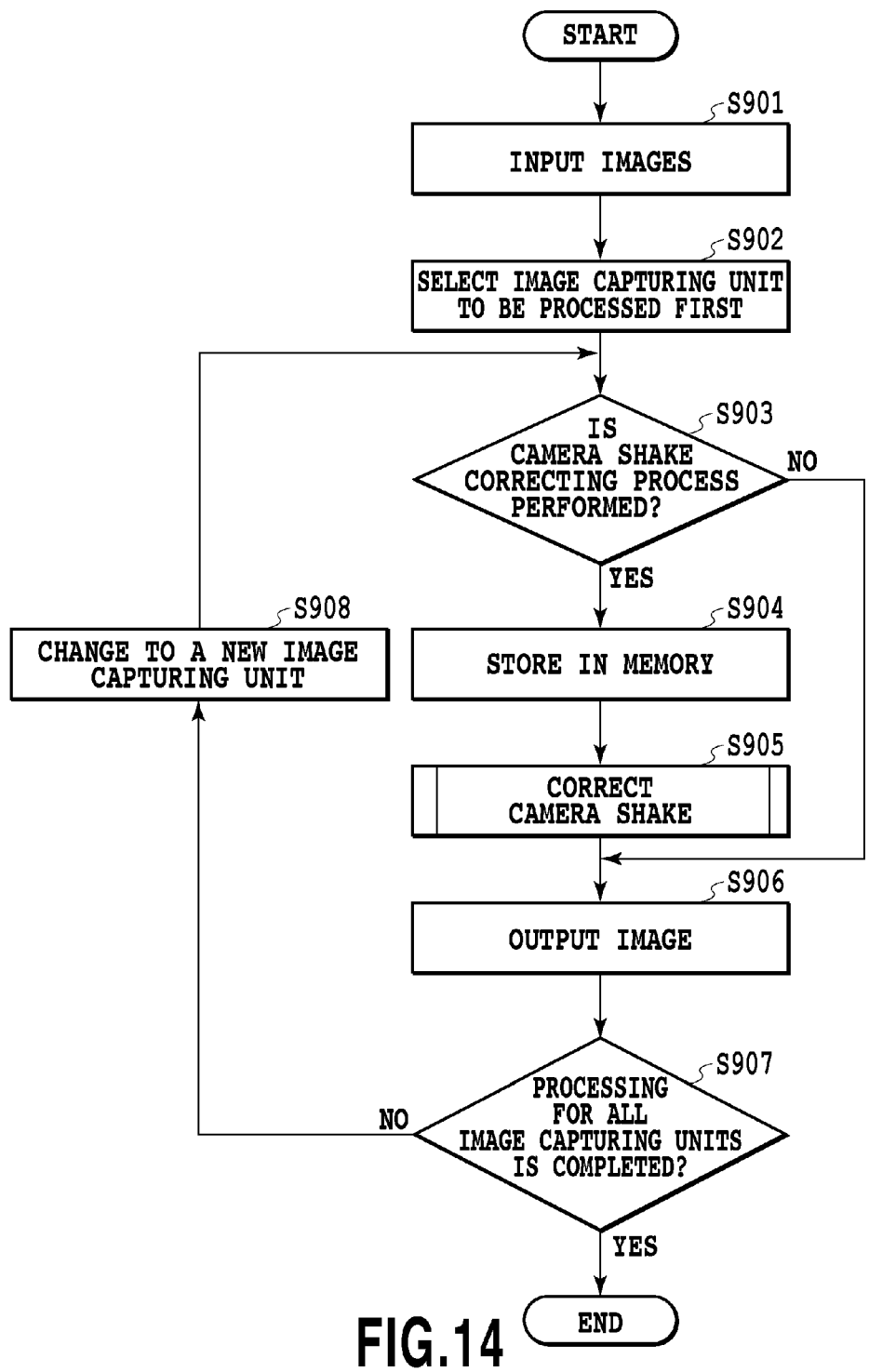
FIG. 14 is a flow chart showing a processing flow in image processing unit according to embodiment 1.

Next, the image processing as performed by the aforementioned functional units of the image processing unit 212 will be explained in detail. FIG. 14 is a flow chart showing a processing flow in the image processing unit 212. At step 901, the image acquisition unit 800 receives captured images from the image capturing units 101-104. As explained by referring to FIG. 5 and FIG. 6, the number of images acquired in one image capturing operation differs based on the focal distance. The image acquisition unit 800 acquires one image each from the image capturing units 101 and 102 via the bus 204 and three images each from the image capturing units 103 and 104.

At step 902, the image processing unit 212 first selects an image capturing unit to be processed. Here, the image capturing unit 101 is chosen. At step 903, the determination unit 801 determines whether or not the camera shake correction needs to be executed on the selected image capturing unit. If it determines that the camera shake correction needs to be done, the processing continues to step 904 where it carries out the camera shake correction processing. If at step 903, on the other hand, the determination unit 801 determines that the selected image capturing unit does not require the camera shake correction, the processing proceeds to step 906 where it outputs the acquired image.

In step 904, the image processing unit 212 temporarily stores in the memory unit 802 a group of images acquired by the selected image capturing unit. At step 905 the camera shake correcting unit 803 executes the camera shake correction processing. The camera shake correction processing will be detailed later. At step 906 the image output unit 808 outputs the camera shake-corrected images supplied from the camera shake correcting unit 803 and the images that are determined by the determination unit 801 as not requiring the camera shake correction. At step 907 the image processing unit 212 determines if the above processing has been completed for all the image capturing units. If there is any unprocessed image capturing unit, the image processing unit 212 continues to step 908, where it changes to the image capturing unit to be processed next before returning to step 903. The above processing from step 903 to step 907 is repeated until all the image capturing units are processed. When the above processing is completed for all the image capturing units at step 907, the processing is exited.

Above is the outline of the processing performed by the image processing unit 212. With this processing done as described above, it is possible to produce camera shake-restrained images from only the camera shake-prone image capturing units, thus reducing the required memory volume as well as the processing load.

<Camera Shake Correction Processing>

Figure 15:
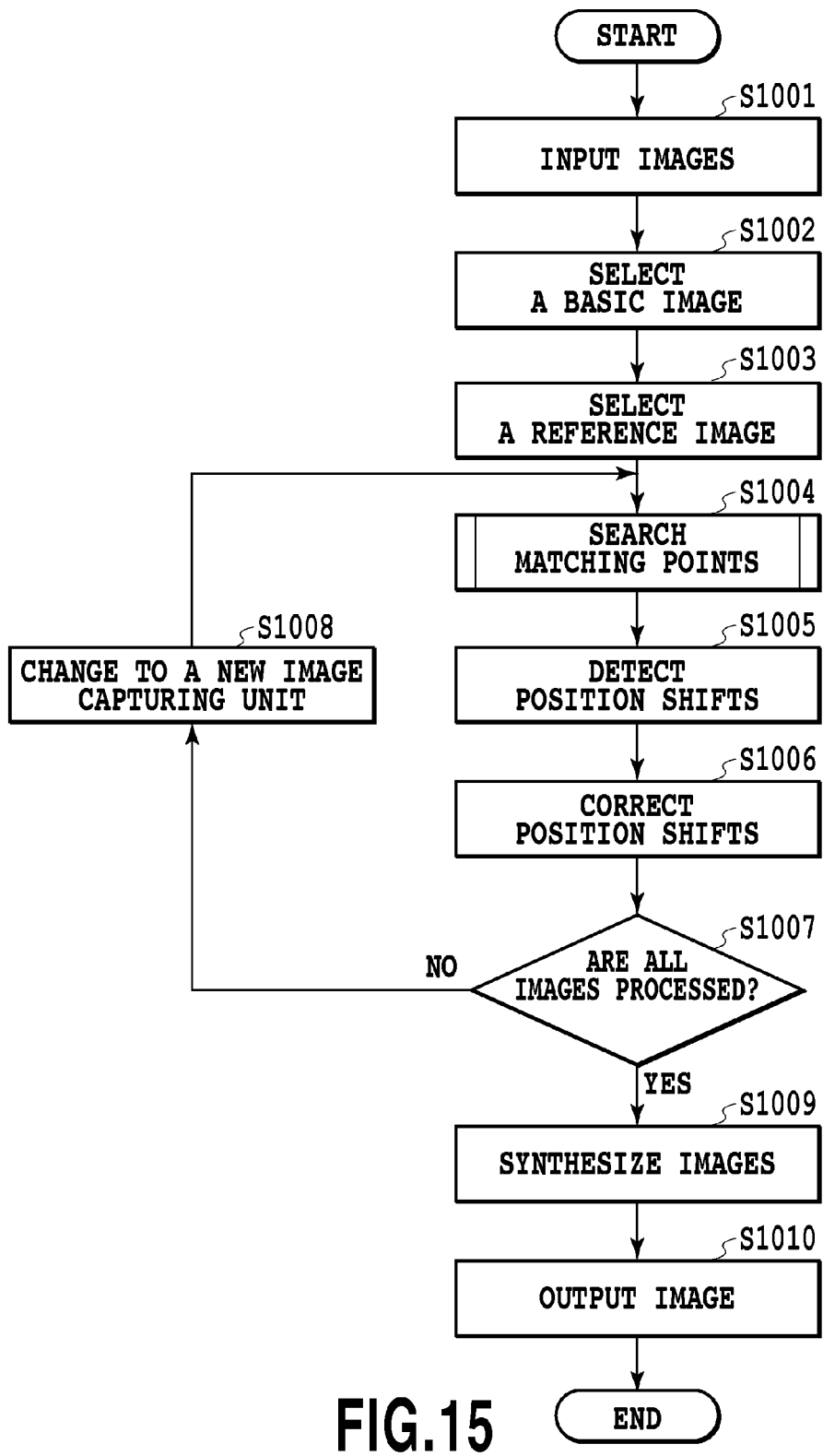
FIG. 15 is a flow chart showing a camera shake correction processing flow according to embodiment 1.

Next, details of the camera shake correction processing performed by the individual units of the camera shake correcting unit 803 shown in FIG. 13 will be explained. FIG. 15 is a flow chart showing a processing flow in the camera shake correcting unit 803. At step 1001 the camera shake correcting unit 803 takes in a plurality of images from the memory unit 802. In this example, three images i(x, y, m) captured by the image capturing unit 103 are taken in. (x, y) represents a coordinate position of an image. m representing an image number is, in this example, m=0, 1, 2 denoting the three images used. At step 1002, the camera shake correcting unit 803 selects a basic image from among the plurality of images taken in. Here, of the successively captured images, an image i(x, y, 0) that was captured first in a time scale is chosen as the basic image.

At step 1003, the camera shake correcting unit 803 selects one reference image from the plurality of input images excluding the basic image. In this example, of the successively captured images, an image i(x, y, 1) captured next to the basic image is chosen as a reference image. At step 1004, the matching point searching unit 804 checks the pixel value similarity between the basic image and the reference image to determine matching pixels. Details of the matching point search operation will be given later. At step 1005, the moving amount calculating unit 805, based on the result of operation by the matching point searching unit 804, detects a position displacement between the basic image and the reference image. The detection of the position displacement between the images is accomplished by determining affine parameters.

The detection of affine parameters will be detailed below. If it is assumed that, from the result of the matching point search, a center coordinate of a concerned block in the basic image is (x, y) and a center coordinate of a block in the reference image have moved to (x', y'), then this relationship can be expressed by equation (1).

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad (1)$$

where a 3×3 matrix is an affine transformation matrix. Each of elements of this matrix constitutes an affine parameter. When a=1, b=0, d=0 and e=1, this transformation is a translation with c representing a horizontal moving amount and f a vertical moving amount. A rotary moving amount through an angle θ can be represented by a=cos θ, b=−sin θ, d=sin θ and e=cos θ. Equation (1) can be expressed in a more generalized matrix form by equation (2).

$$x' = Ax \tag{2}$$

where x and x' are 1×3 matrices and A is a 3×3 matrix. When there are n valid motion vectors, the coordinate position of the concerned image can be expressed by an n×3 matrix, like equation (3).

$$X = (x_1 x_2 \ldots x_n)$$

$$X = (x_1 x_2 \ldots x_n)$$

$$X' = (x'_1 x'_2 \ldots x'_n) \tag{3}$$

Therefore, for n motion vectors, they can be expressed as by equation 4.

$$X' = AX \tag{4}$$

That is, the affine matrix A of equation (4), when determined, represents a position displacement of the entire image. The affine matrix of equation (4) can be rewritten into equation (5).

$$A' = X'X^T (XX^T)^{-1} \tag{5}$$

This method, which allows the amount of motion to be expressed with parameters of the affine transformation, makes it also possible to cope with other blurs, such as in-plane roll blurs and forward-backward zooming blurs, in addition to shift blurs that may occur during handheld shooting.

Now let us return to the processing by the camera shake correcting unit 803 in FIG. 13. At step 1006 of FIG. 15, the position correcting unit 806 uses the affine parameters detected by step 1005 to correct the position displacement correction of the reference image. The position displacement correction formula can be defined by equation (6).

$$X_m' = A^{-1} X_m \tag{6}$$

where Xm is an N×3 matrix representing the coordinate position of the reference image and can be expressed as by equation (7). N represents the number of pixels in the image.

$$X_m = (x_1 x_2 \ldots x_N) \tag{7}$$

where Xm' is an N×3 matrix representing the coordinate position of the image after having undergone the position displacement correction. At step 1007, the camera shake correcting unit 803 determines whether the position displacement correction has been done for all reference images. If there is any image remaining to be processed, the camera shake correction 803 proceeds to step 1008, where it updates the image before returning to step 1004. As described above, the processing from step 1004 to step 1007 is repeated until the position displacement correction is complete for all reference images. If step 1007 determines that the position displacement correction processing is finished for all of the images, the processing continues to step 1009. At step 1009 the image synthesizing unit 807 synthesizes the position displacement-corrected image i'(x, y, m) and the basic image i(x, y, 0). The synthesized image $i_t(x, y)$ can be expressed by equation (8).

$$i_t(x, y) = \frac{1}{m} \left( \sum_{m=1}^{l-1} i(x, y, m) + i(x, y, 0) \right) \tag{8}$$

While the image synthesizing as defined by equation (8) is a method for obtaining an average image, any other image synthesizing method may be used. For example, the basic image and the reference image are weighted and synthesized to produce a synthesized image $i_t(x, y)$. When the camera shake correcting unit 803 outputs the synthesized image $i_t(x, y)$ at step 1010, the camera shake correction processing is completed.

Although the camera shake correction processing of FIG. 15 has been described to select from among successively captured images a chronologically first captured image as the basic image, other images may be chosen as the basic. For example, a second or subsequently captured image or one that was captured last may be used as the basic image.

<Matching Point Search Processing>

Figure 16:
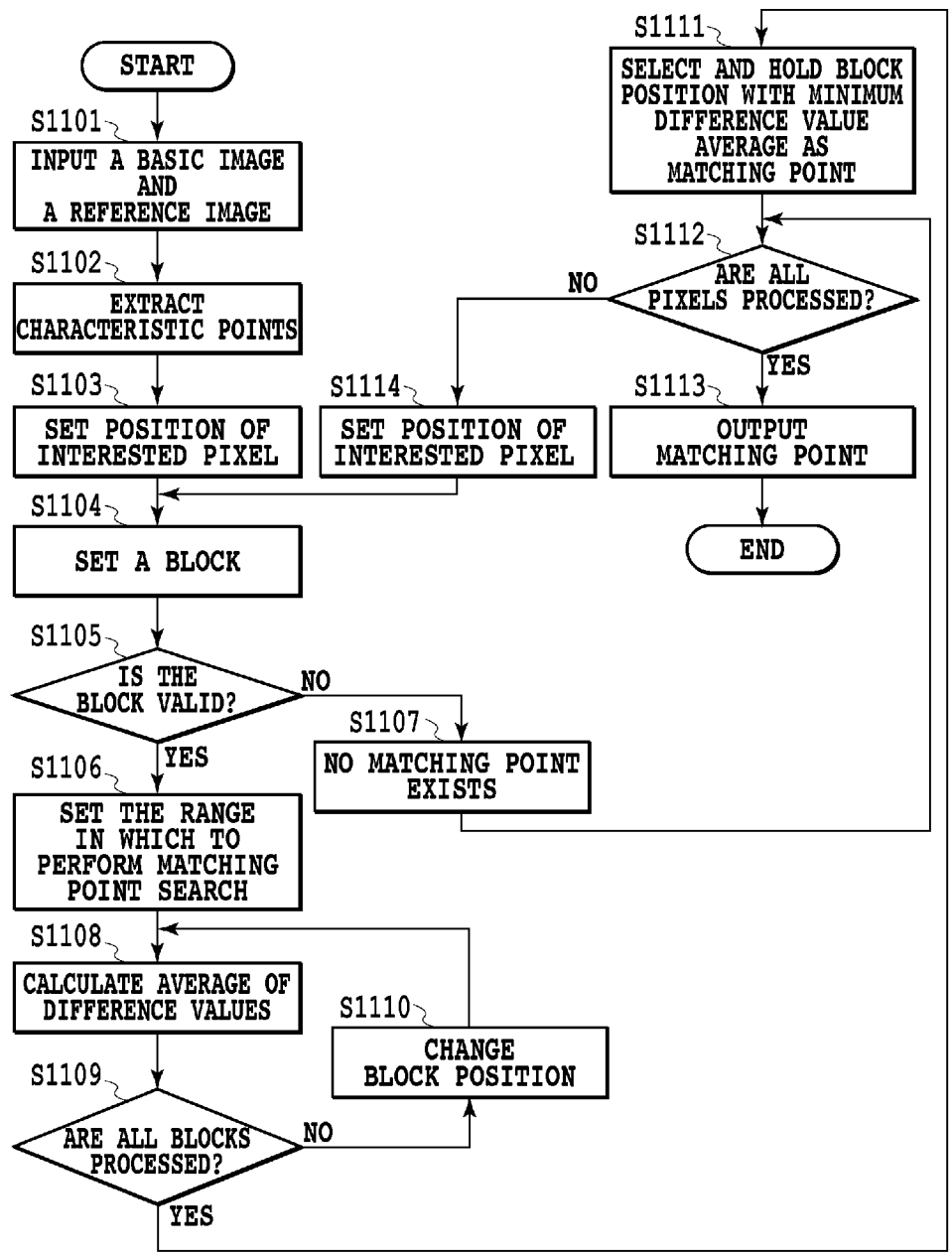
FIG. 16 is a flow chart showing a matching point search processing flow.

FIG. 16 is a flow chart showing a flow of matching point search processing which is represented by step 1004 in the flow chart of FIG. 15. At step 1101, the matching point searching unit 804 takes in the basic image and a reference image. The method for selecting the basic image and the reference image has already been explained. At step 1102 the matching point searching unit 804 extracts characteristic points from the basic image taken in.

For extracting characteristic points a commonly available edge detection filter processing is used. Although this embodiment uses the Sobel filter as the edge detection filter, other edge detection filters may also be used for the extraction of characteristic points. For example, Robinson edge detection filter may be used. Further, these edge detection filters may be used in combination for extracting characteristic points.

At step 1103, the matching point searching unit 804 sets in the basic image the coordinate position (x, y) of an interested pixel used for the matching point search. At step 1104 the matching point searching unit 804 sets in the reference image a predetermined block (used for determining a difference value) with its center located at the interested pixel and a center position (cx, cy) of this block.

Then the matching point searching unit 804 at step 1105 determines if the block with its center at the position (cx, cy) in the basic image is valid for the matching characteristic point search. The determination on the validity of the block is made by the matching point searching unit 804 counting the number of characteristic points executed by step 1102. If the number of characteristic points is found larger than a preset value, the block is determined to be valid. That is, at step 1105 the matching point searching unit 804 determines a block, which has many characteristic points in it, to be valid. When the block is determined to be valid, the unit proceeds to step 1106. If at step 1105 the block being checked is found invalid, the matching point searching unit 804 continues to step 1107.

The matching point searching unit 804 at step 1106 sets a range in which the matching characteristic point search is made. This range can be set arbitrarily considering calculation cost for the search. The only requirement is that the range must include the coordinate position (x, y) of the interested pixel. Generally, when an amount of camera shake is large, it is preferred that the range for the matching characteristic point search be set large. When the amount of camera shake is small, the range may be set small.

Figure 17:
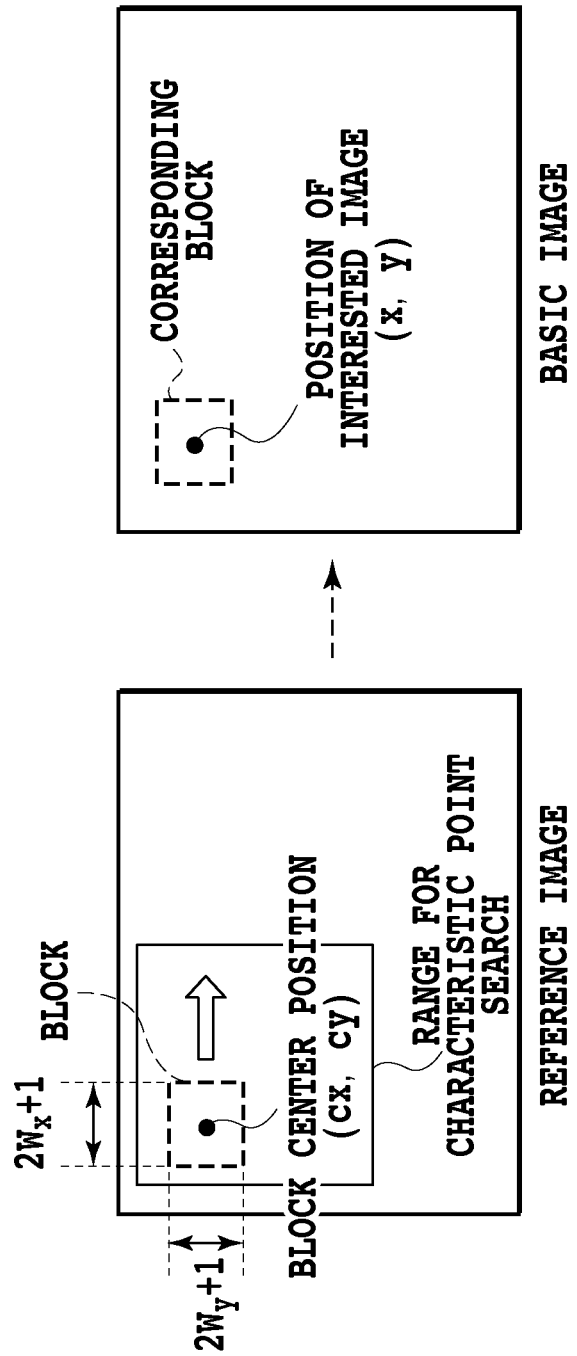
FIG. 17 shows a range in which the matching point search is performed.

FIG. 17 shows the coordinate position (x, y) of the interested pixel, the block set in the reference image, the center position of this block and the range in which the search is made for those points in the reference image that match the characteristic points in the basic image. In this case, the block is defined by $2w_x+1$ pixels in a horizontal direction and $2w_y+1$ pixels in a vertical direction, where $w_x$ and $w_y$ are integer values equal to or more than 0.

Returning to the flow chart of FIG. 16, at step 1107 the matching point searching unit 804 determines that there is no point in the reference image that matches the coordinate position (x, y) of the interested pixel in the basic image. The matching point searching unit 804 at step 1108 calculates an average of difference values by using the basic image and the reference image in the range of the set block. Equation (9) determines the average Eave(cx, cy, m) of difference values at the center position (cx, cy) of the block.

$$E_{ave}(cx, cy, m) = \frac{1}{(2w_x+1)(2w_y+1)} \sum_{a=-wx}^{wx} \sum_{b=-wy}^{wy} |I(x+cx+a, y+cy+b, m) - I(x, y, 0)| \quad (9)$$

where I(x, y, 0) represents the basic image and I(x, y, m) represents a reference image. m denotes a variable indicating a reference image number. At step 1109 the matching point searching unit 804 determines whether the operation to calculate an average of difference values has been completed for all blocks in the range that was set for the matching characteristic point search. If the difference value average calculation is found to be finished for all of the blocks, the unit 804 continues to step 1111. If, on the other hand, there is any unprocessed block, the unit continues to step 1110.

At step 1110, the matching point searching unit 804 updates the center position (cx, cy) of the block to change the block position to the one for which the average of the difference values has yet to be determined. Once the block position is changed, the unit 804 returns to step 1108. At step 1111, the matching point searching unit 804 determines the center position (x', y') of a block having a minimum difference value average in the range that was set for the matching characteristic point search, and selects it as the matching point. That is, the pixel position in the reference image m that matches the pixel position (x, y) in the basic image is selected as the coordinate (x', y').

At step 1112 the matching point searching unit 804 determines if the operation to calculate the difference value average has been completed for all pixels in the basic image. If the difference value average calculation is found to be completed for all pixels, the unit proceeds to step 1113. If, on the other hand, there is any pixel remaining to be processed, the unit continues to step 1114, where it updates the position of the interested pixel (x, y) to that of a pixel that has yet to undergo the difference value average calculation operation. After changing the position of the interested pixel, the unit 804 returns to step 1104. At step 1113 the matching point searching unit 804 outputs the matching point between the basic image and the reference image, before exiting the processing.

Although the matching characteristic point search operation in this embodiment uses the average of difference values between the basic image and the reference image, as defined in equation (9), to find a matching point between the two images, other values may also be used. For example, a correlation coefficient, a value that gives a level of similarity between the images at a neighborhood of the interested pixel, may be used for the search of a matching point.

As described above, with this embodiment it is possible to produce from a group of images acquired by a camera array image capturing apparatus an image with no camera shake while reducing the amount of required memory and the load of processing.

Embodiment 2

In embodiment 1 the number of images acquired by an image capturing unit that performs the camera shake correction is fixed, independent of its focal distance. In embodiment 2 on the other hand, an example case will be described in which the camera shake correction is made by changing the number of images captured based on the focal distance of the image capturing unit. Those portions that are identical with the corresponding ones in embodiment 1 will not be given detailed explanation, with only their differences described here.

Figure 18:
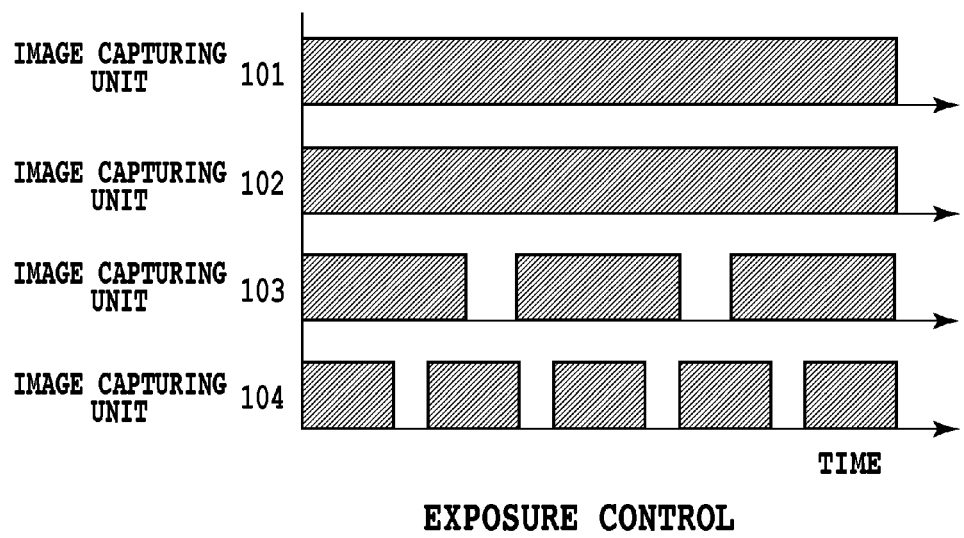
FIG. 18 shows another example of the exposure control of the image capturing units according to embodiment 2.

FIG. 18 shows an exposure control on the image capturing units 101-104. The image capturing units 101 and 102 have relatively short focal distances (wider angles of view), which means that their captured images are less likely to be blurred. The image capturing units 103 and 104, on the other hand, have relatively long focal distances (narrow angles of view). So, their captured images are prone to be blurred when the image capturing apparatus is subjected to the similar level of hand tremor. In this embodiment, as in embodiment 1, an electronic camera shake correction mechanism is provided to the image capturing units 103 and 104 with relatively long focal distances. FIG. 19 shows shutter speeds for the image capturing units 101-104 and the number of images captured by each unit in one image capturing operation. For the image capturing units 101 and 102, since no camera shake correction is carried out, the shutter speed is set at 20 ms and one image is captured in one image capturing operation. For the image capturing unit 103 with a focal distance of 100 mm, the shutter speed is set at 6 ms and three images are captured in one image capturing operation.

The image capturing unit 104 with a longer focal distance of 150 mm has its shutter speed set at 3.5 ms and captures five images in one image capturing operation. In this embodiment too, as in embodiment 1, the camera shake correction operation is executed on the image capturing units 103 and 104 by using a plurality of captured images. That is, a camera shake correction method is employed, by which, for the image capturing unit with a relatively long focal distance, the shutter speed is set relatively fast to reduce the effect of camera shake while at the same time increasing the number of images captured in one image capturing operation. Increasing the number of images acquired by the image capturing unit with a relatively fast shutter speed can keep an overall exposure in one image capturing operation constant. That is, the amount of exposure that has decreased as a result of increasing the shutter speed is compensated for by capturing a plurality of images and synthesizing them to secure the volume of data required of one image capturing unit. When considered from the standpoint of noise, this method of increasing the number of images used by the image synthesis in the camera shake correction processing is advantageous in terms of suppressing an increase in noise and can therefore produce a camera shake-corrected image.

The number of image capturing units that execute the camera shake correction processing is not limited to the two units 103 and 104. The camera shake correction may be performed by three image capturing units 102-104. For example, the image capturing unit 102 may capture two images in one image capturing operation for the camera shake correction processing. It is also possible to execute the camera shake correction processing only on the image capturing unit 104 with the longest focal distance. Further, the number of images captured for the camera shake correction processing is not limited to three or five as described above but any desired number of images may be used as long as they are two or more. For example, the image capturing unit 103 may capture five images and the image capturing unit 104 eight images.

As explained in embodiment 1 by referring to FIG. 5 to FIG. 7, this invention is applicable to cases where there are two or more image capturing units with nearly the same focal distances. In the plurality of image capturing units with nearly the same focal distances, the numbers of images acquired by these image capturing units in one image capturing operation may be set to the same or different numbers. As long as the number of images captured by an image capturing unit with a relatively long focal distance is set larger than those captured by other image capturing units with shorter focal distances, this invention is applicable even if the number of images captured in one image capturing operation does not completely match the focal distance of each image capturing unit.

As described above, this embodiment can produce a noise-suppressed, camera shake-corrected image from a group of images captured by a camera array image capturing apparatus. Further, since in this embodiment an optimal shutter speed can be selected based on the focal distance, an image produced can be more effectively camera shake-corrected.

Embodiment 3

In embodiment 1 and 2, a plurality of images captured at a high shutter speed are electronically aligned in position and overlapped to correct camera shake of the images. In embodiment 3, the camera shake correction is made using one captured image. Detailed descriptions of those portions identical with the corresponding ones in embodiment 1 will not be given and only the differences will be explained.

Figure 20:
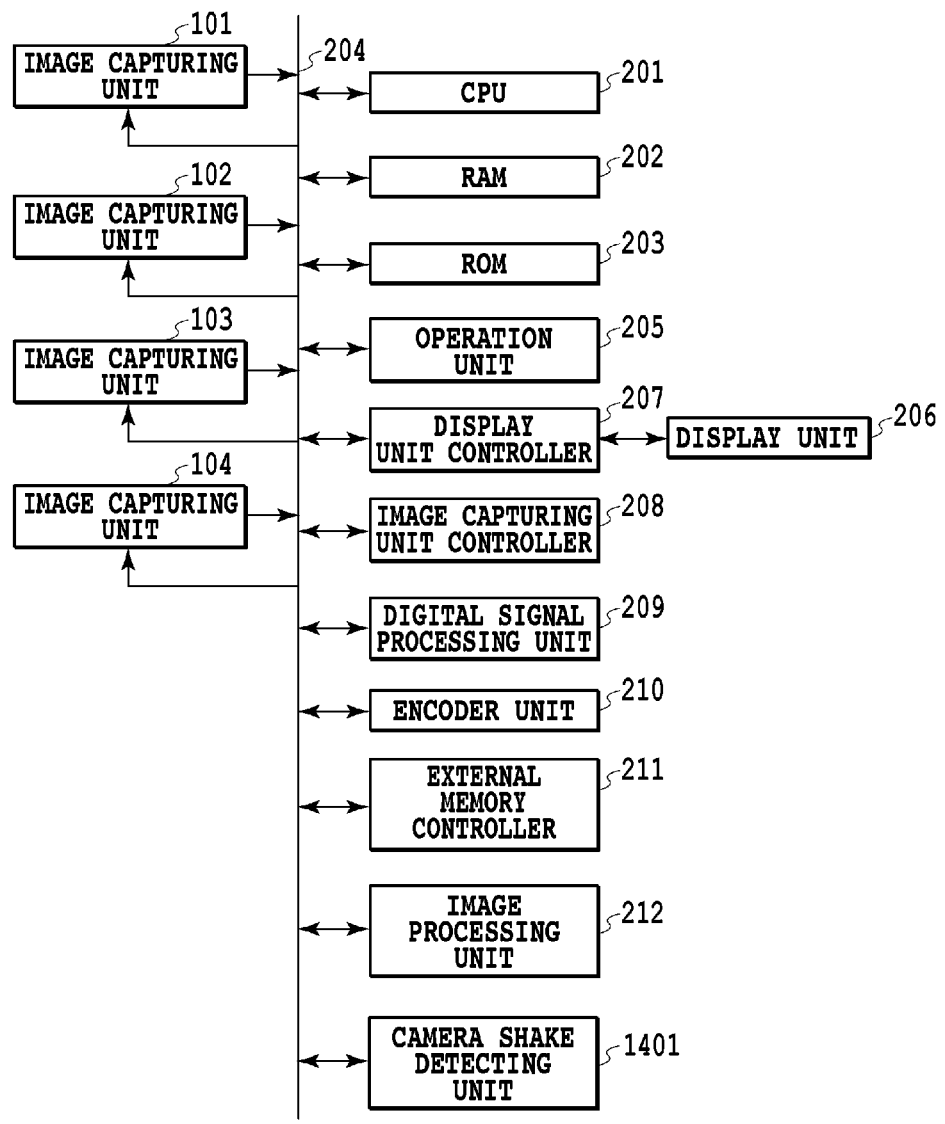
FIG. 20 is a block diagram showing an internal configuration of a camera array image capturing apparatus according to embodiment 3.

FIG. 20 is a block diagram showing an internal configuration of the image capturing apparatus according to this embodiment. In comparison with FIG. 2, the block diagram of embodiment 1, the configuration of this embodiment is additionally provided with a camera shake detecting unit 1401, as shown in FIG. 20.

Figure 21:
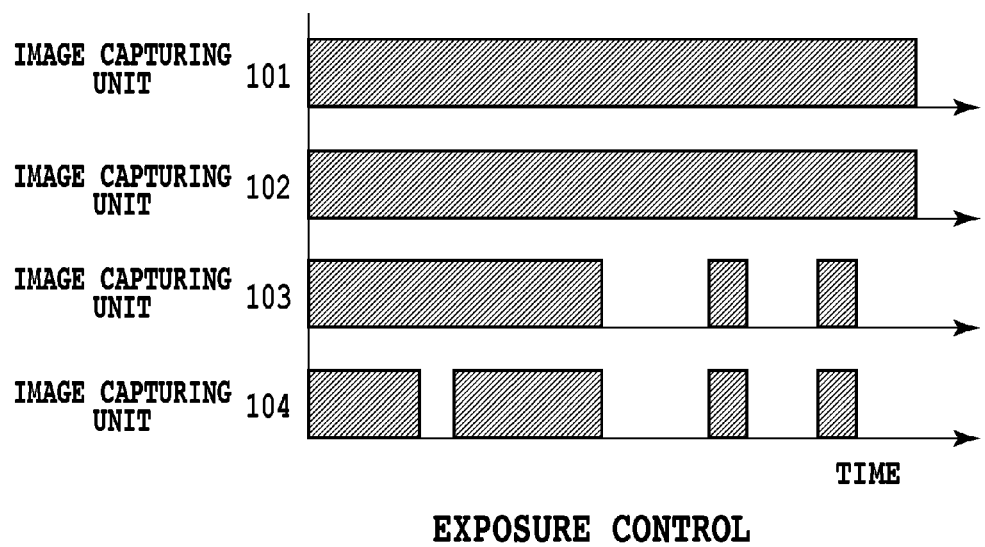
FIG. 21 shows an example of the exposure control of the image capturing units of embodiment 3.

FIG. 21 shows an exposure control on the image capturing units 101-104. The settings of the focal distances of these image capturing units are the same as in embodiment 1. That is, the image capturing unit 101 is set at a focal distance of 25 mm, the image capturing unit 102 at 50 mm, the image capturing unit 103 at 100 mm, and the image capturing unit 104 at 150 mm.

In this embodiment, the image capturing units 103 and 104 with relatively long focal distances perform the shutter open/close operation a plurality of times in one image capturing operation and, by synthesizing a plurality of images captured, acquire single images. The exposure control on the image capturing units 103 and 104 may be performed in any other patterns than the one shown in FIG. 21. In addition, the exposure controls on the image capturing units 103 and 104 do not have to be synchronized. Any other shutter open/close patterns, such as relatively random exposure control patterns, may be employed. It is also noted that the number of image capturing units that perform the camera shake correction processing is not limited to two. For example, three image capturing units 102-104 may carry out the camera shake correction processing. It is also possible to have only the image capturing unit 104 with the longest focal distance execute the camera shake correction processing.

Figure 22:
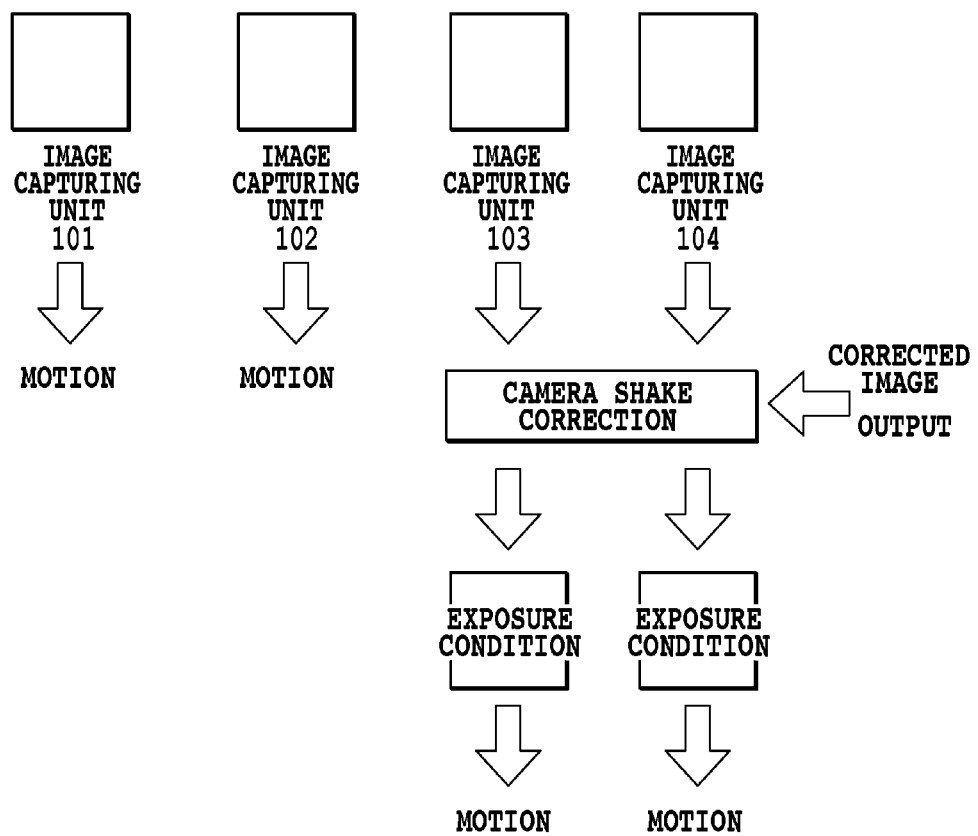
FIG. 22 shows the camera shake correction processing according to embodiment 3.

FIG. 22 is a conceptual diagram explaining the camera shake correction processing. Single images, captured one by each of the image capturing units 101 and 102, are considered to have only negligible image degradations caused by camera shake and therefore output without undergoing the camera shake correction processing. The image capturing units 103 and 104 each capture one image by an exposure control based on random shutter operations and these images are subjected to the camera shake correction processing to output a corrected image. The camera shake correction processing of this embodiment, though detailed later, uses blur information supplied from the camera shake detecting unit 1401 of FIG. 20 and the exposure condition supplied from the image capturing unit controller 208 in calculating and correcting the camera shake, and then outputs the corrected image. Since the camera shake correction processing of this embodiment requires a special exposure control and a significant amount of calculation, it is not executed on the captured images captured by the image capturing units 101 and 102 with relatively short focal distances.

<Configuration of Image Processing Unit>

Figure 23:
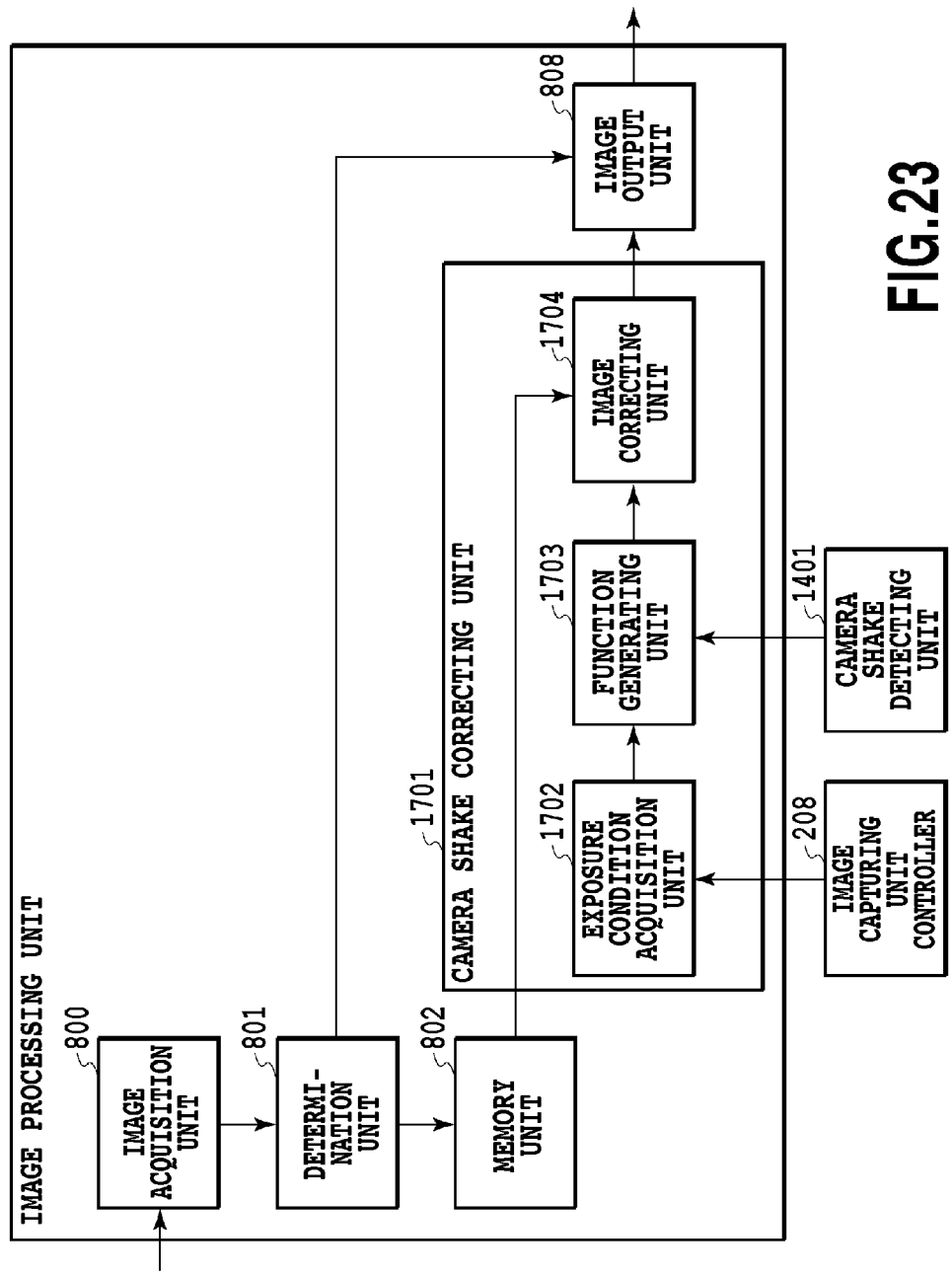
FIG. 23 is a block diagram showing an internal configuration of the image processing unit according to embodiment 3.

FIG. 23 is a block diagram showing an internal configuration of the image processing unit in this embodiment. Compared with FIG. 13, the block diagram of embodiment 1, the embodiment 3 has a different configuration of the camera shake correcting unit 1701. Configurations of other units, such as the image acquisition unit 800, the determination unit 801, the memory unit 802 and the image output unit 808, are identical with those in embodiment 1 and their explanations are omitted. The camera shake correcting unit 1701 uses camera shake information supplied from the camera shake detecting unit 1401 during the image capturing operation and the exposure condition supplied from the image capturing unit controller 208 in executing the camera shake correction.

An exposure condition acquisition unit 1702 acquires an exposure condition fed from the image capturing unit controller 208. A function generating unit 1703 uses the camera shake information in image capturing supplied from the camera shake detecting unit 1401 and the exposure condition in generating a correction function required by the camera shake correction as described later. An image correcting unit 1704 applies the function generated by the function generating unit 1703 to the image supplied from the memory unit 802 to correct the image. With the above operations executed, the camera shake correcting unit 1701 completes its processing.

<Camera Shake Correction Processing>

Figure 24:
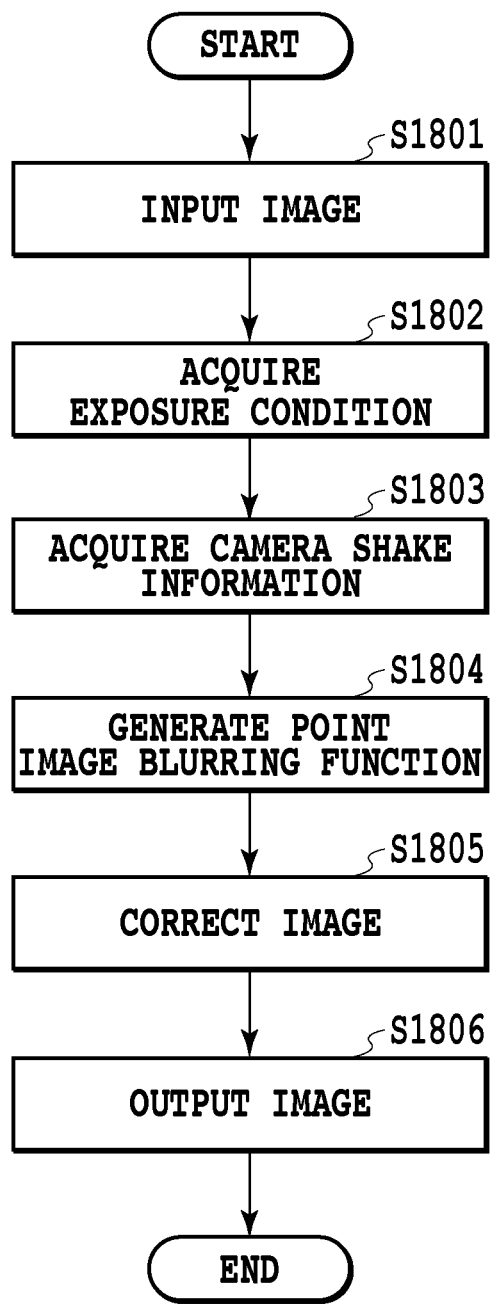
FIG. 24 is a flow chart showing a flow of correction processing in embodiment 3.

The camera shake correction processing performed by individual constitutional units of the camera shake correcting unit 1701 will be described in detail by referring to FIG. 24, which shows a processing flow in the camera shake correcting unit 1701. At step 1801, the camera shake correcting unit 1701 receives images from the memory unit 802. At this time, it is assumed that an intensity of incoming light at a pixel position (x, y) per unit time is i(x, y), a blur velocity of the image capturing apparatus is v and an exposure time is T. Since light information i(x, y) shifted by vT enters the image capturing apparatus at time t, image data $i_{blur}(x, y)$ that is actually captured can be calculated by equation (10). For the sake of simplicity, equation (10) assumes that a camera shake occurs only in a vertical direction (y direction).

$$i_{blur}(x, y) = \frac{1}{T} \int_0^T i(x, y + vt)h(t)dt \quad (10)$$

where h(t) is a function representing the exposure condition, taking either 1 or 0. The value 1 represents a state where the shutter is open and the value 0 represents a state where the shutter is closed. Next, at step 1802, the exposure condition acquisition unit 1702 acquires the exposure condition of the image capturing apparatus through the image capturing unit controller 208. The exposure condition includes the exposure time T and the shutter open/close information h(t).

At step 1803, the camera shake correcting unit 1701 acquires the camera shake information of the image capturing apparatus obtained by the camera shake detecting unit 1401 and feeds it to the function generating unit 1703. Here, the camera shake information of the image capturing apparatus corresponds to the blur velocity v of the image capturing apparatus. At step 1804 the function generating unit 1703 receives the exposure condition and the blur velocity of the image capturing apparatus to generate a point spread function (PSF), a blur function of a point image. The generation of PSF will be detailed later.

At step 1805 the image correcting unit 1704 applies the function generated by the function generating unit 1703 to the image supplied from the memory unit 802 in order to correct the image. More specifically, the function h(t) produced by the function generating unit is used in the deconvolution processing for image correction. For the deconvolution, any desired existing algorithm may be used. It may include, for example, a division in a frequency space, Lucy-Richardson algorithm, algorithm using Wiener filter and algorithm using normalized filter. In this embodiment, the information h(t) on the shutter open/close condition is controlled to implement the division in a frequency space. Details of repair processing for the camera shake correction through the deconvolution will be provided later. When the camera shake correcting unit 1701 outputs the corrected image at step 1806, this processing is complete.

<Function Generation Processing>

The function generating unit 1703 in the camera shake correcting unit 1701 of FIG. 23 will be explained. The function generating unit 1703 generates a deconvolution function to be used in the image correction operation by step 1805. The convolution calculation in a real space can be described in the form of a product in a spatial frequency. So, Fourier-transforming both sides of equation (10), which expresses the processing for acquiring captured data, results in equation (11).

$$I_{blur}(u, v) = \frac{1}{vT} I(u, v)H(u) \quad (11)$$

where $I_{blur}(u, v)$, $I(u, v)$ and $H(u)$ are Fourier-transformed $I_{blur}(x, y)$, $i(x, y)$ and $h(t)$, respectively. Next, by rewriting equation (11) for $I(u, v)$, we get equation (12).

$$I(u, v) = \frac{vT}{H(u)} I_{blur}(u, v) \quad (12)$$

Equation (12) represents the function prepared by the function generating unit 1703.

<Image Correcting Unit>

The image correcting unit 1704 in the camera shake correcting unit 1701 of FIG. 23 will be explained. In equation (12) the blur velocity v of the image capturing apparatus fed from the camera shake detecting unit 1401 and the exposure time T supplied from the exposure condition acquisition unit 1702 are known parameters. Further, since $I_{blur}(u, v)$ and $H(u)$ are able to be obtained by Fourier-transforming the captured image data $i_{blur}(x, y)$ and the shutter open/close information h(t), these functions are also known. So, by solving the equation (12) in the image correcting unit 1704, the Fourier-transformed I(u, v) of the camera shake correction image can in principle be obtained.

However, depending on the exposure condition h(t), the Fourier-transformed value of h(t), namely H(u), may hold a value of 0. That is, on the right side of equation (12) there may occur a so-called "division by zero." In that case, I(u, v), a solution of equation (12), cannot be determined correctly. To avoid the "division by zero," the opening and closing of the shutter during the image capturing operation is performed randomly, as shown in FIG. 21. In other words, the order and lengths of 0 and 1 held in the exposure condition h(t) are set randomly. This enables the frequency characteristic of PSF to be set to other than zero.

Figure 25:
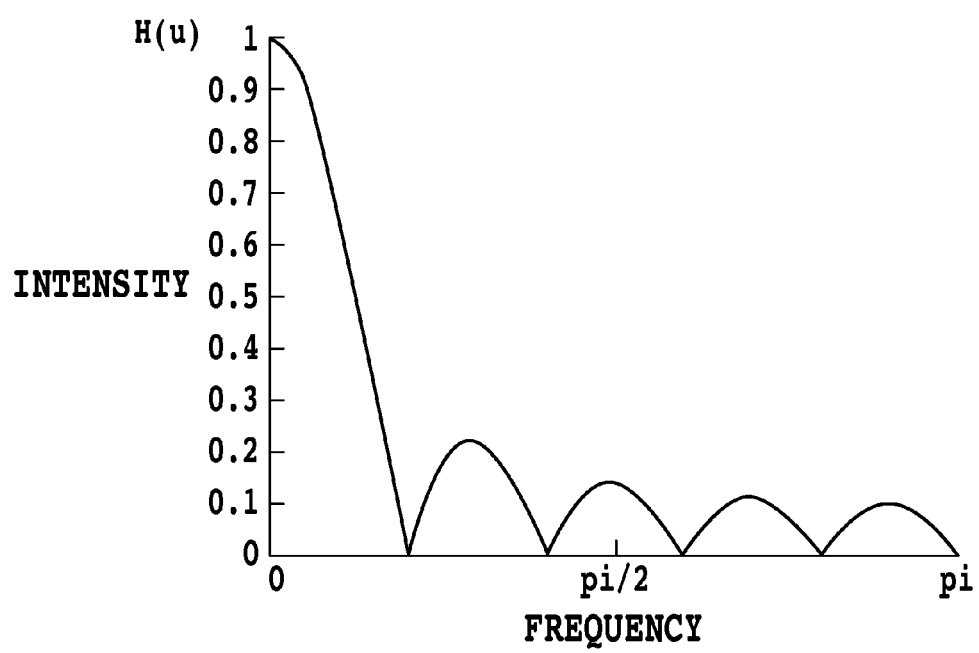
FIG. 25 is a graph showing a frequency characteristic of shutter closure information on an image capturing unit of embodiment 3.
Figure 26:
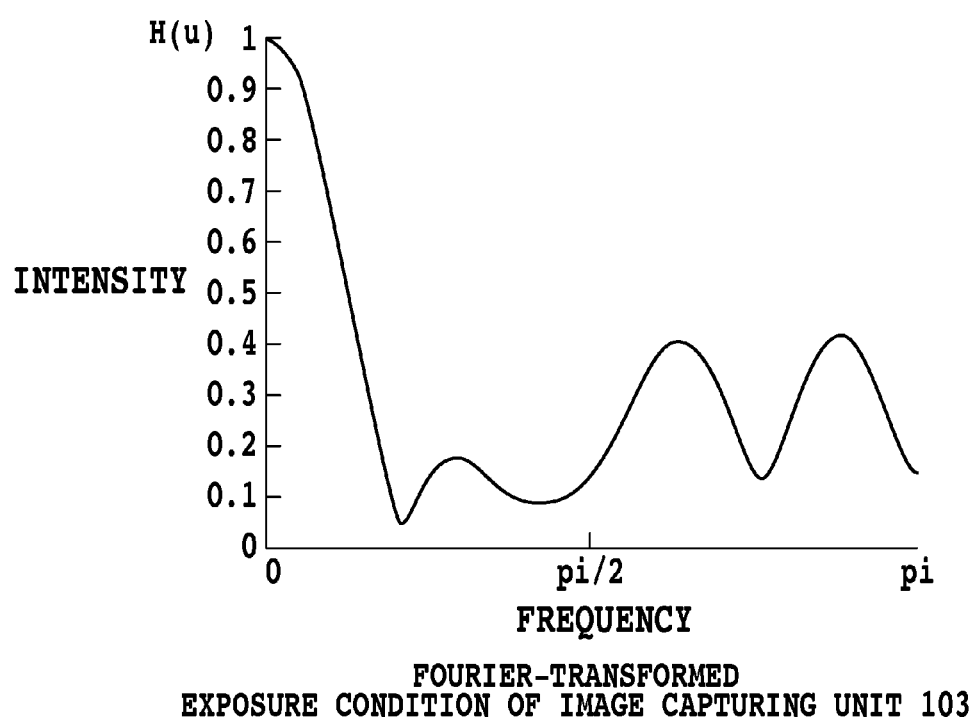
FIG. 26 is a graph showing a frequency characteristic of shutter closure information on another image capturing unit of embodiment 3.

FIGS. 25 and 26 show frequency characteristics obtained by Fourier-transforming the shutter open/close information (exposure condition) of the image capturing units 101 and 103 and plotting light intensities for each frequency. The shutter open/close patterns of the image capturing units 101 and 103 shown in FIG. 21 are set as follows.

$h_{101}(t) = [1, 1, 1, 1, 1, 1, 1, 1, 1, 1, 1, 1, 1, 1, 1]$
$h_{103}(t) = [1, 0, 1, 0, 1, 1, 1, 1, 0, 0, 0, 1, 0, 0, 1]$

Here, $h_{101}(t)$ is an exposure condition for the shutter open/close pattern of the image capturing unit 101. $h_{103}(t)$ is an exposure condition for the shutter open/close pattern of the image capturing unit 103. In this example, the exposure time, or the time in which the image capturing unit receives light in one image capturing operation, is set at T=15. Referring to FIG. 26, it is seen that the image capturing unit 103 that has performed the shutter opening and closing in a random manner has non-zero values for all frequencies. Since image information can be obtained in all frequency bands, the image correction can be made by deconvolution using equation (12). With the normal shutter opening and closing as performed by the image capturing unit 101, on the other hand, there are a plurality of locations where the frequency is zero, as shown in FIG. 25. Because of the so-called "division by zero" occurring during the image correction operation, proper camera shake correction cannot be made.

While in this embodiment the deconvolution processing has been described to be performed on captured images containing only vertical camera shake, the camera shake that can be subjected to the deconvolution are not limited to the vertical camera shake. Image data containing other blurs, such as horizontal and slant camera shake, can also be corrected by deconvolution.

As explained above, this embodiment enables the camera shake correction to be executed from a single captured image, which in turn simplifies the camera shake correction processing performed by the image processing unit.

Embodiment 4

In embodiment 1 to 3, the camera shake is corrected by performing the image processing on captured images. In this embodiment a method of correcting camera shake of an image capturing apparatus by controlling a relative position between an image capturing lens and an image capturing element will be described. Detailed descriptions of those portions identical with the corresponding ones in embodiment 1 will not be given and only the differences will be explained.

Figure 27:
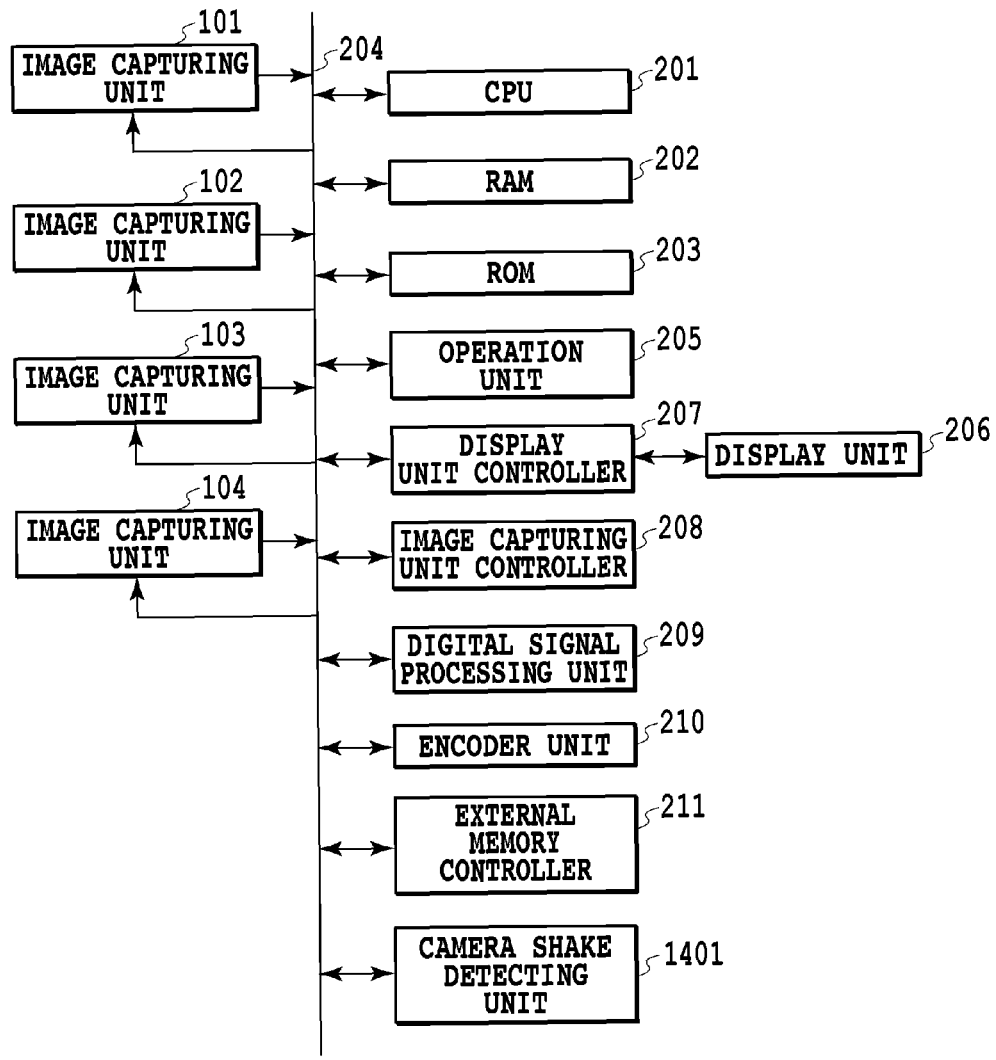
FIG. 27 is a block diagram showing an internal configuration of a camera array image capturing apparatus according to embodiment 4.

The image capturing apparatus of this embodiment is the same as that of FIG. 1, so its explanation is omitted. FIG. 27 is a block diagram showing an internal configuration of the image capturing apparatus of this embodiment. In comparison to the block diagram of FIG. 2 for embodiment 1, the block diagram of FIG. 27 shows that the camera shake detecting unit 1401 for detecting camera shake during image capturing is added, taking the place of the image processing unit 212. As the camera shake detecting unit 1401 in this embodiment a gyro sensor that detects an angular speed may be used. Other sensors may also be used.

Figure 28:
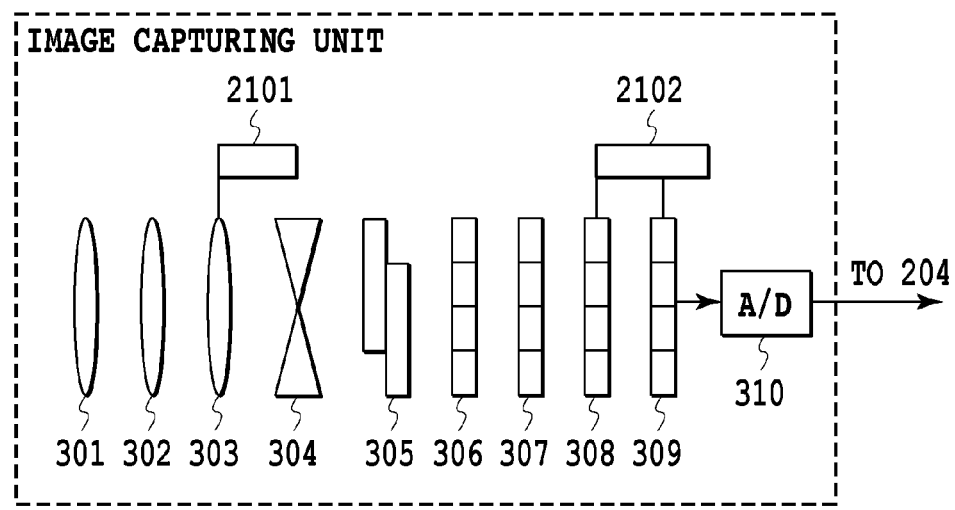
FIG. 28 shows an internal configuration of the image capturing unit of embodiment 4.

FIG. 28 shows the internal configuration of image capturing units with a camera shake prevention mechanism. In comparison with the internal configuration of the image capturing units shown in FIG. 3, it is seen that this embodiment has a camera shake prevention lens 303, a camera shake prevention lens drive unit 2101, a sensor drive unit 2102 for driving the sensor 309 and the color filter 308, all added to the configuration of embodiment 1. The camera shake prevention in this embodiment is briefly explained as follows. According to the angular velocity that the camera shake detecting unit 1401 has detected during image capturing, the image capturing unit controller 208 controls the camera shake prevention lens drive unit 2101 and the sensor drive unit 2102. At this time, both of the lens drive unit and the sensor drive unit or only one of them may be driven so as to cancel blurs of an image being captured. The camera shake prevention lens drive unit 2101, when operated, shifts an optical axis of the camera shake prevention lens 303 in a direction that eliminates the blurs. The sensor drive unit 2102, when operated, moves an optical axis of the sensor 309 and the color filter 308 in a direction that eliminates the blurs.

Figure 29:
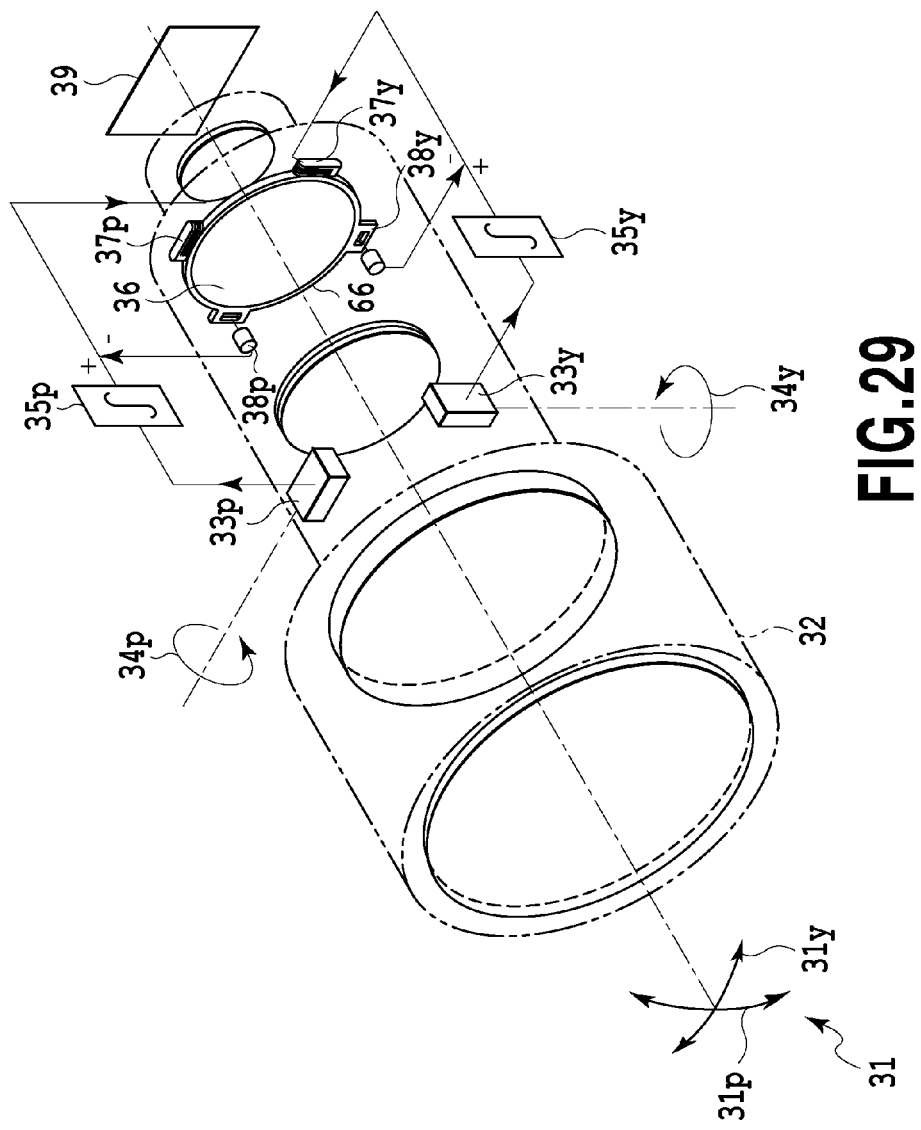
FIG. 29 shows an example method for preventing image blurring due to camera shake.

The camera shake prevention method using a gyro sensor will be explained by referring to FIG. 29. FIG. 29 shows an example method for minimizing a vertical shake 31$p$ and a horizontal shake 31$y$ of an image capturing apparatus in arrow directions. As shown in FIG. 29, components of the camera shake prevention mechanism are installed in a lens cylinder 32. Gyro sensor 33$p$ and 33$y$ detect a vertical shake angular velocity and a horizontal shake angular velocity of the image capturing apparatus in arrow directions 34$p$ and 34$y$, respectively. Known analog integration circuits 35$p$ and 35$y$ integrate signals from the gyro sensors 33$p$ and 33$y$ to produce camera shake angular moving amounts. A correction optical system 36 has drive units 37$p$, 37$y$ and correction optical position sensors 38$p$, 38$y$ and, based on signals from the sensors, operate these drive units to secure stability on a sensor plane 39. The aforementioned analog integration circuits may be eliminated by having the correction optical mechanism itself perform a mechanical integration function.

The camera shake prevention method of this embodiment that shifts an optical axis of the camera shake prevention lens has been described by referring to FIG. 29. Other camera shake prevention methods that shift a sensor and a color filter can also be operated in the same way. It is also possible to adopt a camera shake prevention method that shifts the camera shake prevention lens, which is a part of the lens, or one or both of the sensor and color filter, or all of them.

As described above, because a camera shake prevention method of this embodiment shifts an optical axis of both or either of the lens and the sensor installed in the image capturing apparatus, the image processing unit can be eliminated.

Embodiment 5

In embodiment 1 to 4, when an image capturing apparatus has two or more image capturing units with almost similar focal distances (e.g., image capturing units shown in FIG. 6 and FIG. 7), if their focal distances are relatively long, all of the image capturing units with nearly the same focal distances are subjected to the camera shake correction. Or if their focal distances are relatively short, none of the image capturing units with nearly equal focal distances undergoes the camera shake correction. In this embodiment we will describe a camera array image capturing apparatus in which, of the image capturing units with almost the same focal distances, some are subjected to the camera shake correction while the others are not.

Figure 30:
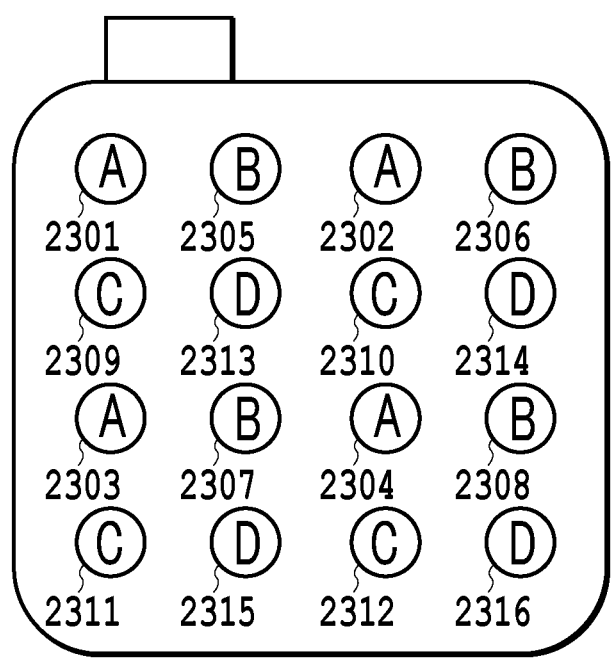
FIG. 30 shows an example of a camera array image capturing apparatus according to embodiment 5.

FIG. 30 shows an example of a camera array image capturing apparatus applicable to this embodiment. The camera array image capturing apparatus shown in FIG. 30 has four different focal distances. More specifically, the image capturing apparatus has four groups of four image capturing units, each group having one and the same focal distance. In FIG. 30, each alphabet is assigned a unique focal distance, with the image capturing units denoted by the same alphabet having the same focal distance. FIG. 31 to FIG. 33 show settings about whether or not individual image capturing units are to undergo the camera shake correction.

In an image capturing apparatus with a setting as shown in FIG. 31, of the four image capturing units with a 100-mm focal distance lens, the camera shake correction is applied to the image capturing units 2310 and 2311. Further, of the four image capturing units with a 150-mm focal distance lens, the camera shake correction is applied to the image capturing units 2314 and 2315. The image capturing units with a 25-mm focal distance lens and a 50-mm focal distance lens are not subjected to the camera shake correction.

In an image capturing apparatus with a setting as shown in FIG. 32, of the four image capturing units with a 50-mm focal distance lens, the camera shake correction is applied to the image capturing units 2306 and 2307. Of the four image capturing units with a 100-mm focal distance lens, the camera shake correction is applied to the image capturing units 2310 and 2311. Further, of the four image capturing units with a 150-mm focal distance lens, three image capturing units 2314-2316 are subjected to the camera shake correction. The image capturing units with a 25-mm focal distance lens are excluded from the camera shake correction.

In an image capturing apparatus with a setting as shown in FIG. 33, of the four image capturing units with a 50-mm focal distance lens, 2306 and 2307 are subjected to the camera shake correction. Of the four image capturing units with a 100-mm focal distance lens, 2310 and 2311 are to undergo the camera shake correction. Further, all of the four image capturing units with a 150-mm focal distance lens are subjected to the camera shake correction. No camera shake correction is applied to the image capturing units with a 25-mm focal distance lens.

In the image capturing apparatus of this embodiment, some of the image capturing units with nearly the same focal distances are subjected to the camera shake correction while the others are exempt from it. Should any camera shake occur with an image capturing unit that does not undergo the camera shake correction, an image acquired by an image capturing unit that executes the camera shake correction may be preferentially output. Or an image that is not camera shake-corrected may be output together with a camera shake-corrected image. In either case, any camera array image capturing apparatus capable of producing a camera shake-corrected image can apply this invention and produce the similar effect.

Although this embodiment has its image capturing units grouped into four, each having a different focal distance, as shown in FIG. 30, any other number of image capturing unit groups with different focal distances may be used. As long as an image capturing apparatus has two or more groups of image capturing units, each group having a different focal distance, the image capturing apparatus can apply this invention. Further, different groups do not need to have the same number of image capturing units with lenses of the same focal distance (in FIG. 30, four image capturing units comprise each group). For example, the camera array image capturing apparatus may have a lens focal distance arrangement as shown in FIG. 7. Further, the lenses are also not limited to four kinds of focal distances and the image capturing units may be constructed of lenses with more than four focal distances. It is also possible to construct the image capturing units of lenses with less than four focal distances. This invention is applicable to any image capturing apparatus as long as it is constructed of image capturing units having lenses with a plurality of focal distances.

The camera shake correction mechanism of this embodiment may use any of the correction mechanisms described in embodiment 1 to 4. A plurality of camera shake correction mechanisms may also be used in one and the same image capturing apparatus. For example, in a camera array image capturing apparatus of FIG. 31, the image capturing units 2310 and 2311 may use the camera shake correction of embodiment 1 and the image capturing units 2314 and 2315 may use the camera shake correction of embodiment 4. Alternatively, the image capturing unit 2310 may use the camera shake correction of embodiment 1, the image capturing unit 2311 that of embodiment 2, the image capturing unit 2312 that embodiment 3 and the image capturing unit 2313 that of embodiment 4.

As described above, since this embodiment does not apply a single camera shake correction equally to all the image capturing units with lenses of almost the same focal distances, the configuration of an image capturing apparatus can be simplified.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-198879, filed Sep. 12, 2011, which is hereby incorporated by reference herein in its entirety.

What is claimed is:

1. A camera array comprising:
a plurality of image capturing units including at least a first image capturing unit with a first focal distance and a second image capturing unit with a longer focal distance than the first focal distance; and
an output unit configured to output first image data acquired by the first image capturing unit without performing a camera shake correction, and output second image data acquired by the second image capturing unit after performing the camera shake correction;
wherein, in response to one image capturing operation, the second image capturing unit captures a plurality of images of a subject to acquire the second image data representing a plurality of images;
wherein the output unit synthesizes the plurality of images represented by the second image data to perform the camera shake correction.

2. A camera array according to claim 1, wherein, in response to one image capturing operation, the first image data is acquired by the first image capturing unit and the second image data is acquired by the second image capturing unit.

3. A camera array according to claim 1, wherein the output unit aligns positions of the plurality of images represented by the second image data and synthesizes the position-aligned images to perform the camera shake correction.

4. A camera array according to claim 1, wherein the number of captured images of the subject is determined based on the focal distance of the second image capturing unit.

5. A camera array according to claim 1, further comprising:
a camera shake detecting unit configured to detect an amount of camera shake in image capturing;
wherein the output unit performs the camera shake correction on the second image data based on the amount of camera shake.

6. A camera array according to claim 1, further comprising:
an exposure condition acquisition unit configured to acquire an exposure condition in image capturing;
wherein the output unit performs the camera shake correction on the second image data based on the exposure condition.

7. A camera array according to claim 6, further comprising:
a function generating unit configured to generate based on the exposure condition a camera shake correction function for correcting the second image data.

8. A camera array according to claim 1, wherein the output unit drives an image capturing lens or an image capturing element of the image capturing unit to perform the camera shake correction on the second image data.

9. A camera array comprising:
a first image capturing unit with a first focal distance;
a second image capturing unit with a second focal distance longer than the first focal distance;
an image capturing unit controller configured to, in response to one image capturing operation, make the first image capturing unit capture one image of a subject to acquire first image data and make the second image capturing unit capture a plurality of images of the subject to acquire second image data;
a camera shake correcting unit configured to synthesize images represented by the second image data to produce synthesized image data; and
an output unit configured to output the first image data and/or the synthesized image data.

10. An image data processing method for a camera array, wherein the camera array comprises a plurality of image capturing units including at least a first image capturing unit with a first focal distance and a second image capturing unit with a longer focal distance than the first focal distance, the method comprising:

outputting first image data acquired by the first image capturing unit without performing a camera shake correction and outputting second image data acquired by the second image capturing unit after performing the camera shake correction;

wherein, in response to one image capturing operation, the second image capturing unit captures a plurality of images of a subject to acquire the second image data representing a plurality of images and the output unit synthesizes the plurality of images represented by the second image data to perform the camera shake correction.

11. An image data processing method according to claim 10, wherein, in response to one image capturing operation, the first image data is acquired by the first image capturing unit and the second image data is acquired by the second image capturing unit.

12. An image data processing method according to claim 10, wherein the output unit aligns positions of the plurality of images represented by the second image data and synthesizes the position-aligned images to perform the camera shake correction.

13. An image data processing method according to claim 10, wherein the number of captured images of the subject is determined based on the focal distance of the second image capturing unit.

14. An image data processing method according to claim 10, further comprising:

a camera shake detecting unit configured to detect an amount of camera shake in image capturing;

wherein the output unit performs the camera shake correction on the second image data based on the amount of camera shake.

15. An image data processing method according to claim 10, further comprising:

an exposure condition acquisition unit configured to acquire an exposure condition in image capturing;

wherein the output unit performs the camera shake correction on the second image data based on the exposure condition.

16. An image data processing method according to claim 15, further comprising:

a function generating unit configured to generate, based on the exposure condition, a camera shake correction function for correcting the second image data.

17. An image data processing method according to claim 10, wherein the output unit drives an image capturing lens or an image capturing element of the image capturing unit to perform the camera shake correction on the second image data.

18. A non-transitory storage medium containing a program for causing a computer to perform the method of claim 10.

19. An image data processing method for a camera array, wherein the camera array comprises a plurality of image capturing units including at least a first image capturing unit with a first focal distance and a second image capturing unit with a longer focal distance than the first focal distance, the method comprising:

in response to one image capturing operation, capturing one image of a subject by the first image capturing unit to acquire first image data and capturing a plurality of images of the subject by the second image capturing unit to acquire second image data;

synthesizing images represented by the second image data to produce synthesized image data; and outputting the first image data and/or the synthesized image data.

20. A non-transitory storage medium containing a program for causing a computer to perform the method of claim 19.

* * * * *